United States Patent
Sayana et al.

(10) Patent No.: US 11,121,834 B2
(45) Date of Patent: Sep. 14, 2021

(54) APERIODIC AND PERIODIC CSI FEEDBACK MODES FOR COORDINATED MULTI-POINT TRANSMISSION

(71) Applicant: Samsung Electronics Co., Ltd., Suwon-si (KR)

(72) Inventors: Krishna Sayana, San Jose, CA (US); Boon Loong Ng, Dallas, TX (US); Young-Han Nam, Richardson, TX (US); Thomas Novlan, Dallas, TX (US); Jinkyu Han, Allen, TX (US); Jianzhong Zhang, Plano, TX (US); Hyojin Lee, Seoul (KR); Youn-Sun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 13/920,872

(22) Filed: Jun. 18, 2013

(65) Prior Publication Data
US 2013/0336214 A1    Dec. 19, 2013

(51) Int. Cl.
*H04L 5/00* (2006.01)
*H04B 7/024* (2017.01)
(Continued)

(52) U.S. Cl.
CPC .......... *H04L 5/0035* (2013.01); *H04B 7/024* (2013.01); *H04B 7/063* (2013.01); *H04B 7/0632* (2013.01);
(Continued)

(58) Field of Classification Search
None
See application file for complete search history.

(56) References Cited

U.S. PATENT DOCUMENTS

| 8,976,751 | B2 | 3/2015 | Yang et al. |
| 2007/0098093 | A1 | 5/2007 | Kwon et al. |

(Continued)

FOREIGN PATENT DOCUMENTS

| CN | 101253709 A | 8/2008 |
| CN | 101370240 A | 2/2009 |

(Continued)

OTHER PUBLICATIONS

International Search Report dated Oct. 11, 2013 in connection with International Patent Application No. PCT/KR2013/005360, 3 pages.
(Continued)

*Primary Examiner* — Christopher M Crutchfield
*Assistant Examiner* — Alan L Lindenbaum

(57) ABSTRACT

Coordinate multi-point (CoMP) transmission is facilitated by resolving collisions between feedback reporting. Based upon the conditions within the network, collision resolution may be by dropping a channel report during a subframe, multiplexing channel reports from a plurality of user equipment, compressing channel reports a plurality of user equipment, and combined reporting, either through joint reports or by using carrier aggregation, for conditions between a user equipment and a plurality of transmission points. New signaling and reporting formats facilitate selection of a collision resolution suitable for current network conditions.

30 Claims, 10 Drawing Sheets

(51) Int. Cl.

| | | |
|---|---|---|
| *H04B 7/06* | (2006.01) | |
| *H04L 12/26* | (2006.01) | |
| *H04W 72/08* | (2009.01) | |
| *H04W 72/04* | (2009.01) | |

(52) U.S. Cl.
CPC ......... *H04B 7/0695* (2013.01); *H04L 5/0048* (2013.01); *H04L 5/0053* (2013.01); *H04L 43/06* (2013.01); *H04W 72/0413* (2013.01); *H04W 72/085* (2013.01); *H04B 7/0647* (2013.01)

(56) References Cited

U.S. PATENT DOCUMENTS

| | | | |
|---|---|---|---|
| 2009/0092178 A1 | 4/2009 | Sayana et al. | |
| 2011/0249643 A1 | 10/2011 | Barbieri et al. | |
| 2012/0287875 A1* | 11/2012 | Kim | H04B 7/024 370/329 |
| 2013/0070720 A1 | 3/2013 | Pan et al. | |
| 2013/0121299 A1 | 5/2013 | Kim et al. | |
| 2013/0258874 A1* | 10/2013 | Khoshnevis et al. | 370/252 |
| 2013/0286904 A1* | 10/2013 | Xu | H04W 72/0406 370/280 |
| 2013/0336244 A1 | 12/2013 | Kuo | |
| 2014/0355468 A1 | 12/2014 | Li et al. | |
| 2015/0085763 A1 | 3/2015 | Gao et al. | |

FOREIGN PATENT DOCUMENTS

| | | |
|---|---|---|
| CN | 102082636 A | 6/2011 |
| CN | 102281128 A | 12/2011 |
| CN | 102291211 A | 12/2011 |
| CN | 102368697 A | 3/2012 |
| CN | 102387526 A | 3/2012 |
| WO | WO 2011/044526 A1 | 4/2011 |
| WO | WO 2011/085230 A2 | 7/2011 |
| WO | WO 2011/088403 A1 | 7/2011 |
| WO | 2011115421 A2 | 9/2011 |
| WO | WO 2011/122911 A2 | 10/2011 |
| WO | 2012/008815 A2 | 1/2012 |
| WO | 2012-011657 A2 | 1/2012 |
| WO | WO 2012/011718 A2 | 1/2012 |
| WO | WO 2012/024181 A1 | 2/2012 |
| WO | WO 2013/145552 A1 | 10/2013 |

OTHER PUBLICATIONS

Written Opinion of International Searching Authority dated Oct. 11, 2013 in connection with International Patent Application No. PCT/KR2013/005360, 7 pages.
Extended European Search Report dated Oct. 1, 2013 in connection with Europen Patent Application No. 13172546.7; 7 pages.
3GPP TSG-RAN WG1 Meeting #65; "Corrections for CA in 36.213"; R1-111570; Barcelona, Spain; May 9-13, 2011; 15 pages.
3GPP TS 36.213 V10.5,0; "Technical Specification Group Radio Access Network; Evolved Universal Terrestrial Radio Access (E-UTRA); Physical layer procedures" Release 10; Mar. 2012; 125 pages.
Office Action dated May 13, 2015 in connection with U.S. Appl. No. 14/571,194, 8 pages.
Office Action dated Jun. 10, 2015 in connection with U.S. Appl. No. 14/571,177, 14 pages.
Office Action dated Sep. 30, 2015 in connection with U.S. Appl. No. 14/571,194, 11 pages.
Final Office Action relating to U.S. Appl. No. 14/571,194 dated Feb. 23, 2016, 11 pages.
Office Action dated Jun. 1, 2016 in connection with U.S. Appl. No. 14/571,177, 11 pages.
Patent Examination Report No. 1 dated Jun. 10, 2016 in connection with Australian Application No. 2013278127, 3 pages.
Office Action dated Jul. 29, 2016 in connection with U.S. Appl. No. 14/571,194, 11 pages.
Nokia et al., "On UE complexity related to DL CoMP CSI", 3GPP TSG RAN WG1 Meeting #69, May 21-25, 2012, 6 pages, R1-122406.
Ericsson et al., "RI and PMI sharing between multiple CSI processes", 3GPP TSG-RAN WG1 #69, May 21-30, 2012, 6 pages, R1-122836.
European Search Report dated Feb. 6, 2018 in connection with European Patent Application No. 17 17 9793.
Communication from a foreign patent office in a counterpart foreign application, "The Second Office Action," Application No. CN 201510111381.5, dated Apr. 20, 2018, 18 pages.
Fujitsu, "Email discussion [69-10]: Details of collision handling and compression/multiplexing in case of 2 or more CSIs being configured in the same reporting instance for CoMP CSI feedback", 3GPP TSG-RAN WG1 #69, R1-122930, Prague, Czech Republic, May 21-25, 2012, 30 pages.
Intel Corporation, "Discussion on rank indicator (RI) report for CoMP", 3GPP TSG-RAN WG1 #69, R1-122631, Prague, Czech Republic, May 21-25, 2012, 4 pages.
Alcatel-Lucent, "CSI Feedback Modes for CoMP", 3GPP TSG-RAN WG1 #69, R1-122480, Prague, Czech Republic, May 21-26, 2012, 4 pages.
Renesas Mobile Europe Ltd., "DL CoMP rank reporting", 3GPP TSG-RAN WG1 #69, R1-122353, Prague, Czech Republic, May 21-25, 2012, 5 pages.
Foreign Communication from Related Counterpart Application, Japanese Patent Application No. 2015-518330, Notification of Reason for Rejection dated Apr. 3, 2017, 11 pages.
Samsung; "Comp RRC Parameters"; 3GPP TSG RAN WG1 #69; R1-122243; Prague, Czech Republic; May 21-25, 2012; 6 pages.
Ericsson et al., "RI and PMI Sharing Between Multiple CSI Processes"; 3GPP TSG-RAN WG1 #69; R1-122836; Prague, Czech Republic; May 21-30, 2012; 6 pages.
Foreign Communication from Related Counterpart Application; Chinese Patent Application No. 201380031795.6; Second Chinese Office Action dated Aug. 29, 2017; 17 pages.
Foreign Communication from Related Counterpart Application; European Patent Application No. 13172546.7; Communication Pursuant to Article 94(3) EPC dated Oct. 20, 2017; 7 pages.
Office Action dated Sep. 25, 2018 in connection with Chinese Patent Application No. 201510111381.5, 22 pages.
Office Action dated Sep. 28, 2019 in connection with India Patent Application No. 2629/KOLNP/2014, 5 pages.
Communication pursuant to Article 94(3) EPC dated Mar. 6, 2020 in connection with European Patent Application No. 17 179 793.9, 5 pages.
Decision of Patent Grant dated Feb. 2, 2020 in connection with Korea Patent Application No. 10-2014-7033772, 5 pages.
Korean Intellectual Property Office, "Notification of Reason for Refusal," Application No. KR10-2014-7033772, dated Oct. 30, 2019, 11 pages.
Catt, "On CSI feedback modes for CoMP," R1-122039, 3GPP TSG RAN WG1 Meeting #69, Prague, Czech Republic, May 21-25, 2012, 6 pages.
Summons to attend oral proceedings pursuant to Rule 115(1) EPC in connection with European Application No. 17179793.9 dated Aug. 4, 2020, 8 pages.

\* cited by examiner

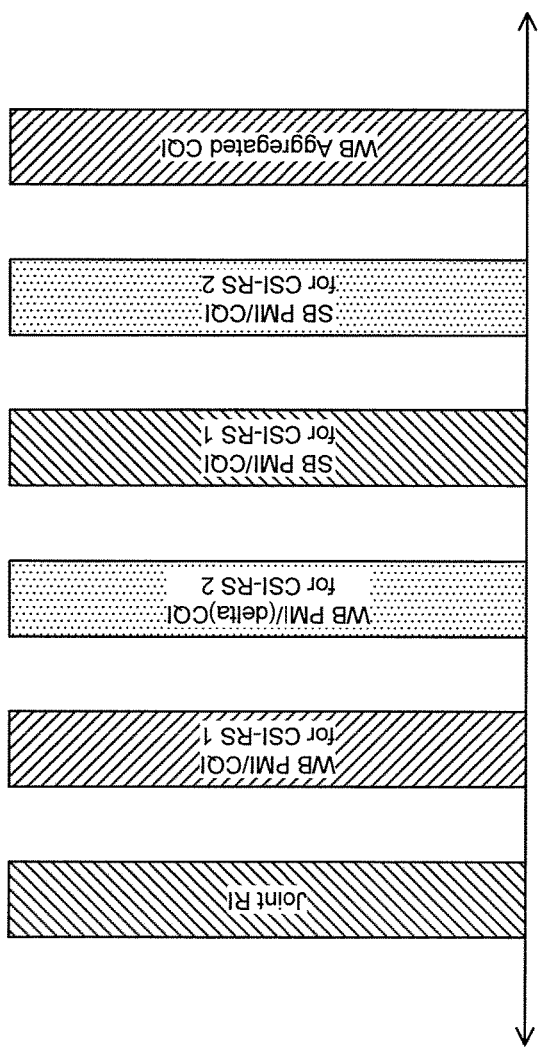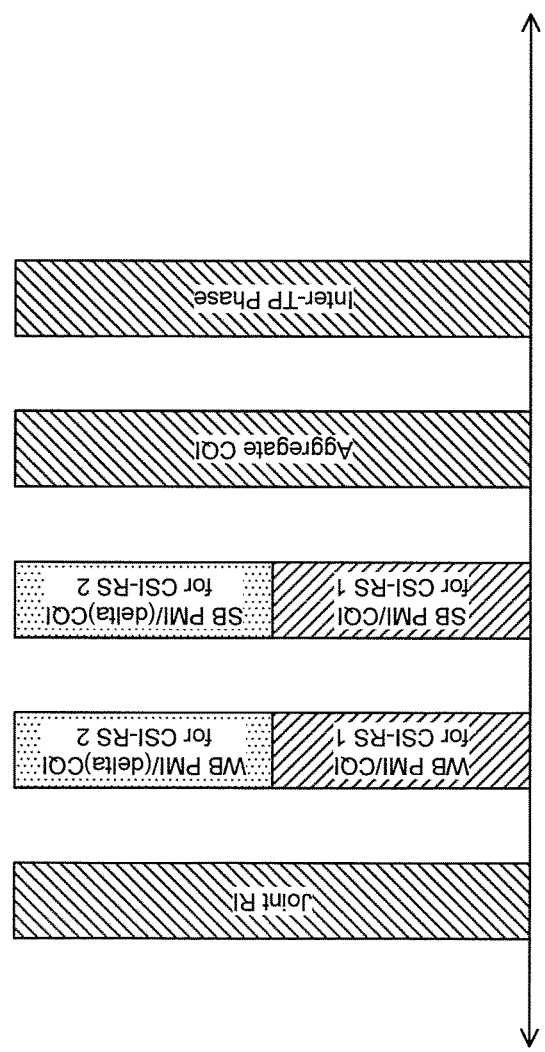

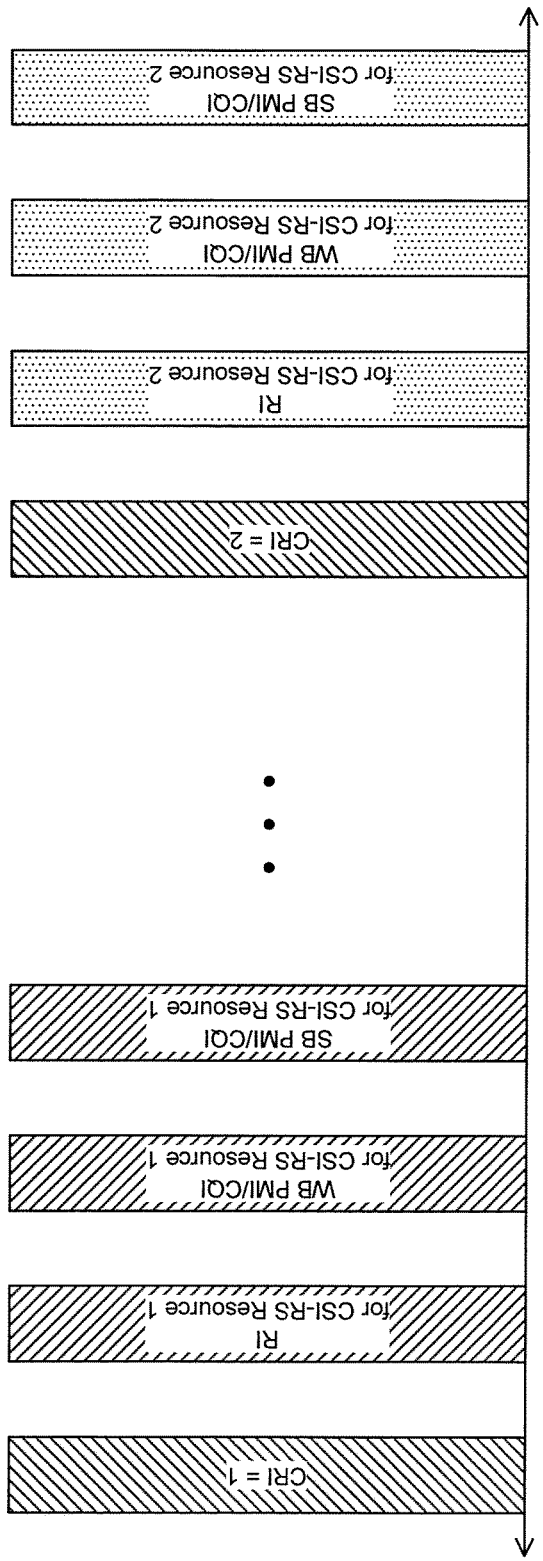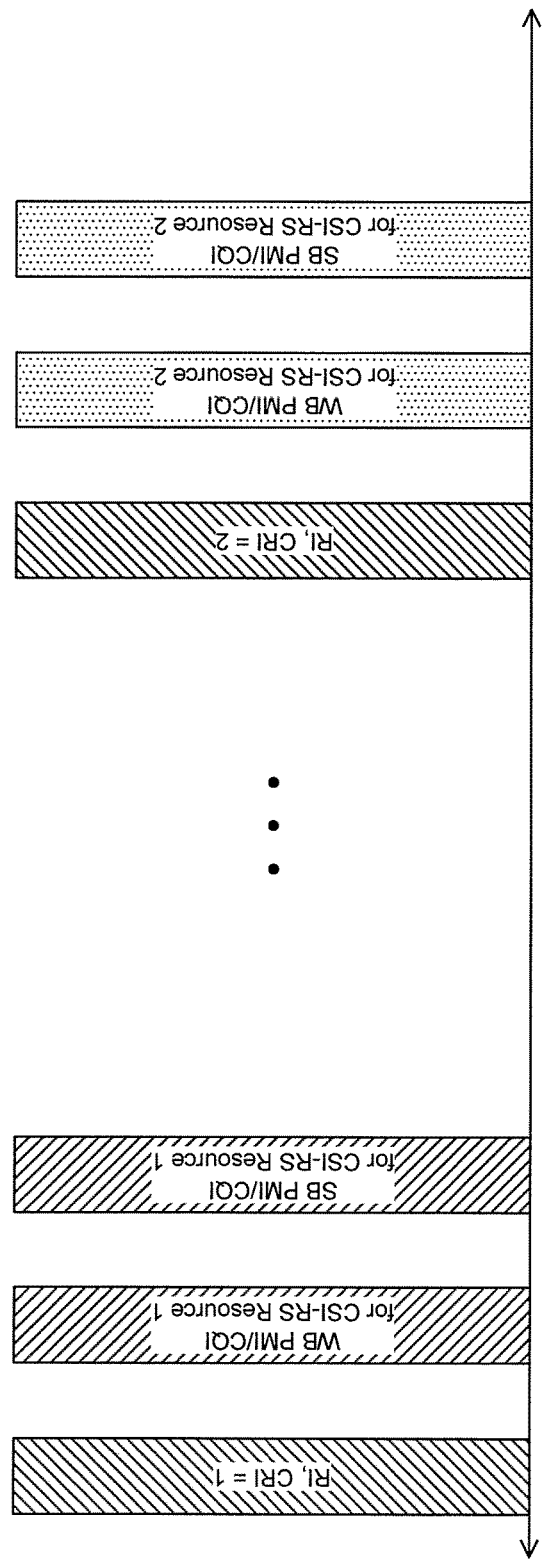

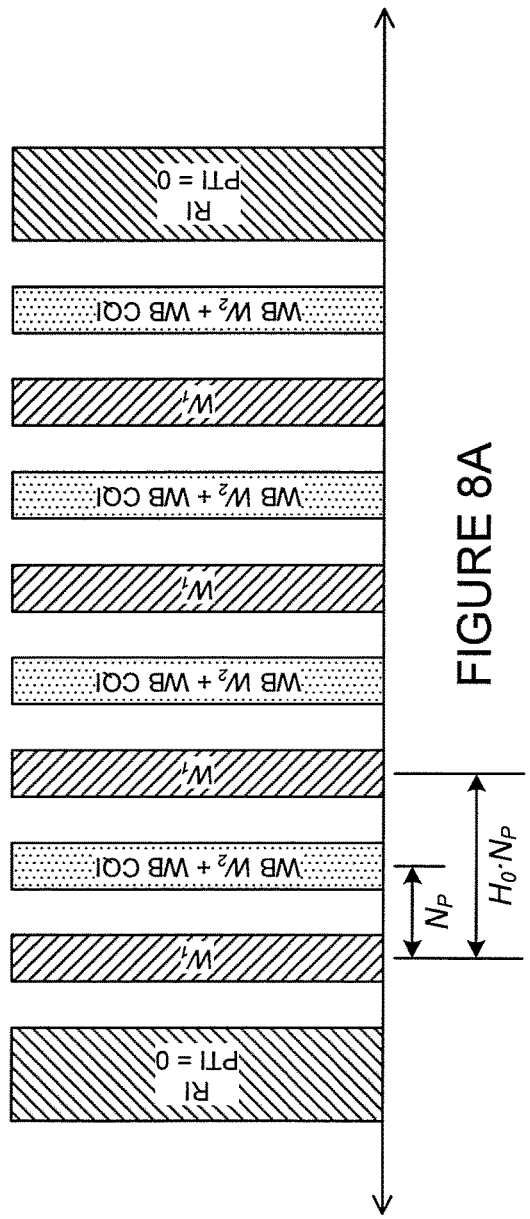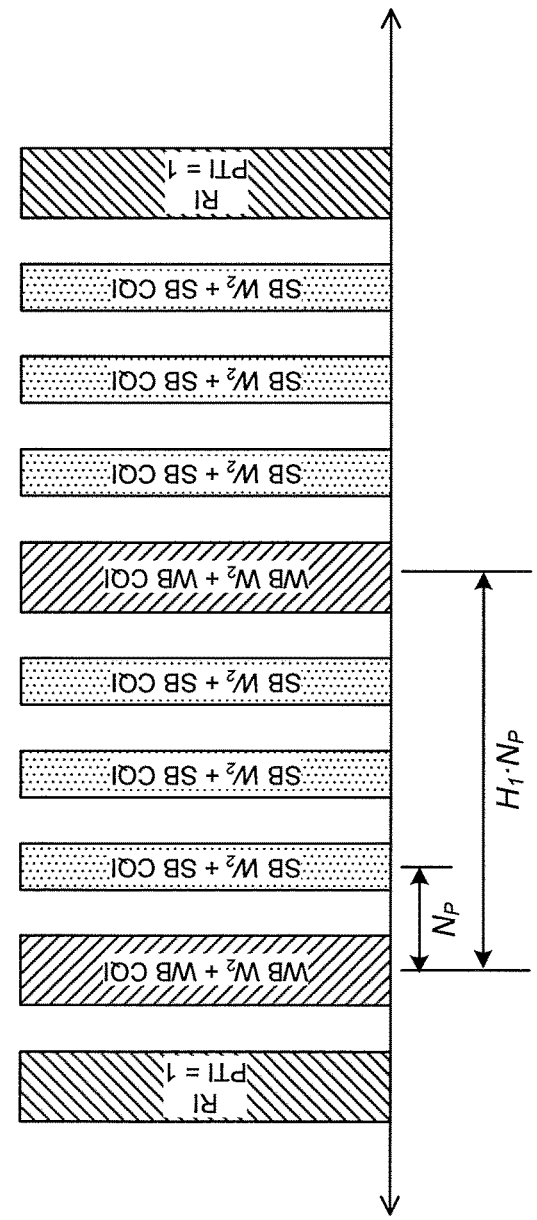

APERIODIC AND PERIODIC CSI FEEDBACK MODES FOR COORDINATED MULTI-POINT TRANSMISSION

This application hereby incorporates by reference U.S. Provisional Patent Application No. 61/661,214, filed Jun. 18, 2012, entitled "APERIODIC AND PERIODIC CSI FEEDBACK MODES FOR COORDINATED MULTI-POINT TRANSMISSION," U.S. Provisional Patent Application No. 61/679,571, filed Aug. 3, 2012, entitled "UE SELECTED SUB-BAND FEEDBACK FOR COORDINATED MULTI-POINT TRANSMISSION," and U.S. Provisional Patent Application No. 61/692,581, filed Aug. 23, 2012, entitled "FEEDBACK CONFIGURATION FOR COORDINATED MULTI-POINT TRANSMISSION."

TECHNICAL FIELD

The present disclosure relates generally to coordinated multi-point transmission and, more specifically, to communication parameter feedback for use in scheduling coordinated multi-point transmission.

BACKGROUND

Coordinated Multi-Point (CoMP) transmission and reception techniques to facilitate cooperative communications across multiple transmission and reception points (e.g., cells) are currently being studied and defined. In CoMP operation, multiple points coordinate with each other in such a way as to improve signal quality to a user with interference avoidance and joint transmission techniques.

For different CoMP transmission schemes, the network needs to know the channel quality information (CQI), precoding matrix indicator (PMI), and rank information (RI) supported by the UE to optimize scheduling. Further, the individual scheme performance is characterized by other parameters, such as interference measurements.

There is, therefore, a need in the art to efficiently feedback signal communication parameters for use in scheduling CoMP transmission.

SUMMARY

Coordinate multi-point (CoMP) transmission is facilitated by resolving collisions between feedback reporting. Based upon the conditions within the network, collision resolution may be by dropping a channel report during a subframe, multiplexing channel reports from a plurality of user equipment, compressing channel reports from a plurality of user equipment, and combined reporting, either through joint reports or by using carrier aggregation, for conditions between a user equipment and a plurality of transmission points. New signaling and reporting formats facilitate selection of a collision resolution suitable for current network conditions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates multiplexing of CSI feedback reports corresponding to multiple CSI-RS resources for coordinated multi-point transmission implemented according to one or more embodiments of the present disclosure;

FIG. 4 illustrates reports for multiple CSI-RS resources configured together for certain report types, such as wideband/subband CQI and/or wideband/subband PMI, with aggregate CQI and/or inter-TP phase reports for coordinated multi-point transmission implemented according to one or more embodiments of the present disclosure;

FIGS. 5A and 5B respectively illustrate a CSI-RS Resource indicator (CRI) sent separately to indicate switching, and jointly encoding RI and CRI, for reports for coordinated multi-point transmission implemented according to one or more embodiments of the present disclosure;

FIGS. 8A and 8B illustrate feedback reporting based upon PTI for coordinated multi-point transmission implemented according to one or more embodiments of the present disclosure.

DETAILED DESCRIPTION

FIGS. 1A through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein:

REF1 3GPP TS 36.211 v10.1.0, "E-UTRA, Physical channels and modulation";
REF2 3GPP TS 36.212 v10.1.0, "E-UTRA, Multiplexing and Channel coding";
REF3 3GPP TS 36.213 v10.1.0, "E-UTRA, Physical Layer Procedures";
REF4 RP-111365 Coordinated Multi-Point Operation for LTE WID; and
REF5 3GPP TR 36.819 V11.0.0 (2011-09).

Figure 1A:
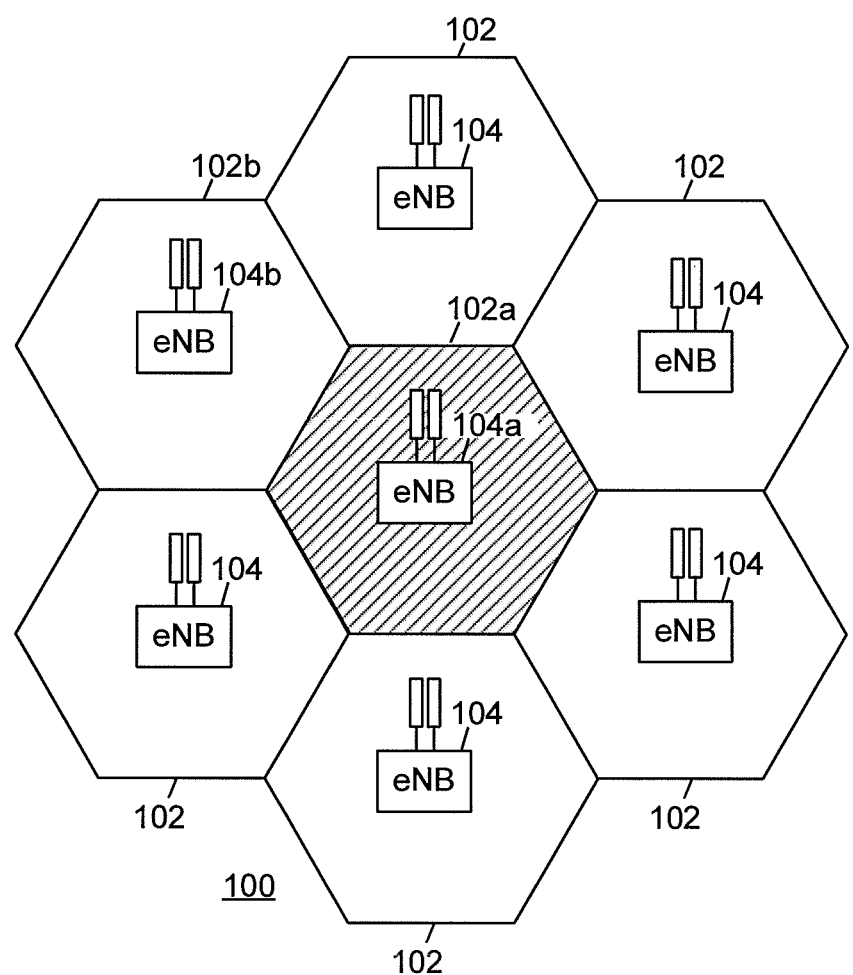
FIGS. 1A, 1B and 1C are high level diagrams illustrating a network within which CSI feedback for coordinated multi-point transmission may be implemented according to one or more embodiments of the present disclosure.
Figure 1B:
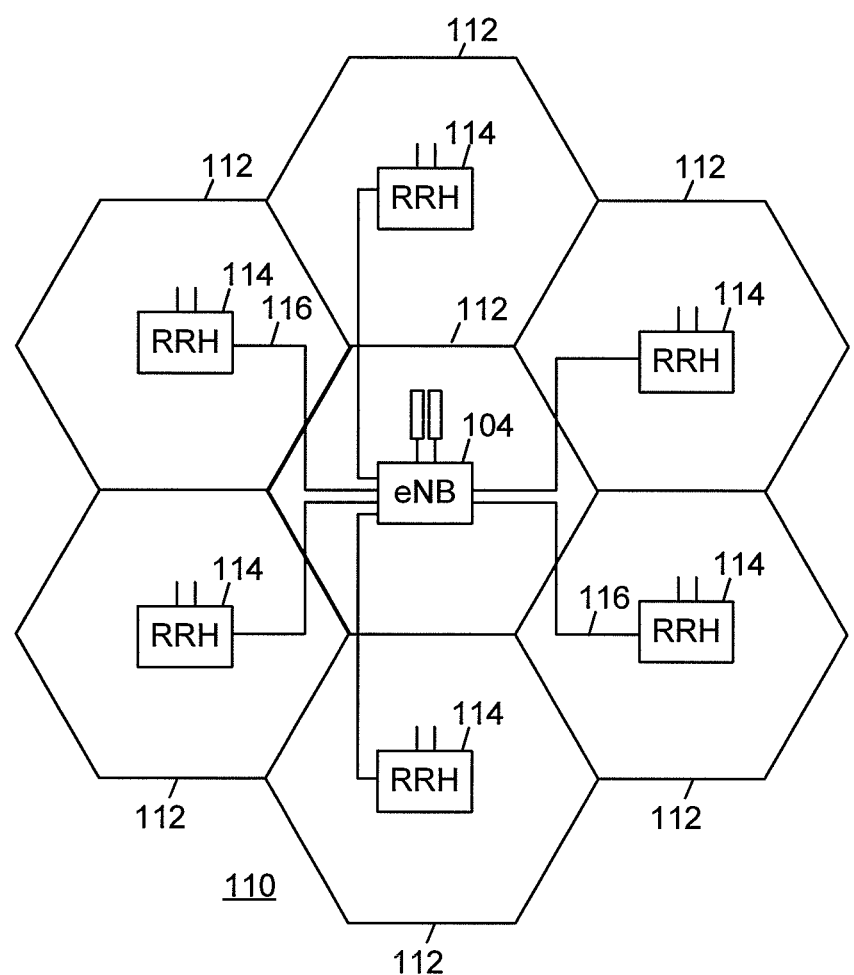
Figure 1C:
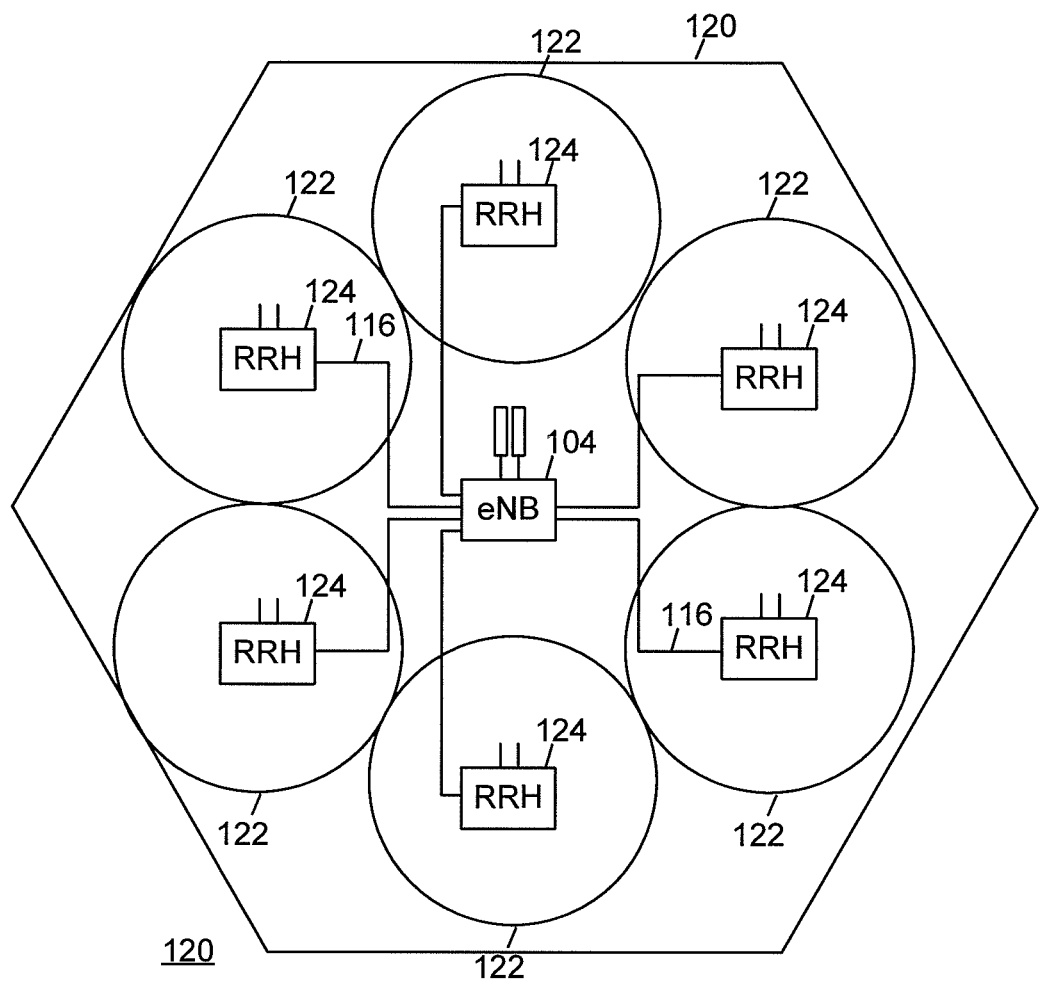

FIGS. 1A, 1B and 1C are high level diagrams illustrating a network within which CSI feedback for coordinated multi-point transmission may be implemented according to one or more embodiments of the present disclosure. FIG. 1A illustrates a homogenous wireless communications network 100 with intra-site CoMP. Each cell or coverage area 102, simplistically depicted in FIG. 1A as a hexagon for convenience of explanation but actually having a variable shape, includes a base station 104, also referred to as an evolved Node B (eNB) for purpose of the Long Term Evolution (LTE) family of standards promulgated by the 3$^{rd}$ Generation Partnership Project (3GPP). Each eNB 104 includes a control system, such as a programmable processor, communicably coupled to a memory and via transmitter and receiver chains to a transceiver for transmission and reception of wireless signals using at least one antenna. The control system of each eNB 104 may schedule communications of specific types, such as feedback, from mobile stations within the corresponding coverage area 102. The eNBs 104 are in communication with each other in accordance with the known art to allow for coordinate multi-point transmission of such communications.

A plurality of mobile stations (or "user equipment") located in (or moving through) the coverage areas 102 are served by the eNBs 104, receiving wireless signals from an eNB 104 and transmitting data by wireless signals through the eNB 104, and upon occasion may be served by more than one eNB 104 concurrently. Each user equipment includes a control system, such as a programmable processor, also communicably coupled to a memory and also communicably coupled via transmitter and receiver chains to a transceiver for transmission and reception of wireless signals using at least one antenna. As known in the art, the eNBs 104 and the mobile stations communicate using Orthogonal Frequency Division Multiplexing (OFDM) symbols transmitted over defined frequencies and time periods comprising a communications channel. The frequencies of the communications channel are divided into bands and subbands, and an individual carrier frequency (or set of carrier frequencies) for one time period is referred to as a "resource element" (RE). The control system of the mobile station is configured to measure the quality of wireless signals from an eNB 104 on the different bands or subbands, and generate various known channel information for feedback to the eNB 104 based on a "wideband" (a group of subbands) or a subband.

FIG. 1B illustrates a homogenous wireless communications network 110 with one eNB 104 and a plurality of high transmission power remote radio heads (RRHs) 114, each with a coverage area 112. The RRHs 114 each have a structure similar to the eNB 104, including a control system, memory and transmit/receive subsystems. The RRHs 114 are coupled to the eNB 104 by optical fiber 116.

FIG. 10 illustrates a wireless communications network 120 with one eNB 104 having a coverage area 120 and a plurality of low transmission power remote radio heads (RRHs) 124, each with an omni-directional antenna and a coverage area 122. Like the RRHs 114, the RRHs 124 each have a structure similar to the eNB 104, including a control system, memory and transmit/receive subsystems. The RRHs 124 are coupled to the eNB 104 by optical fiber 116.

Using FIG. 1A as representative of all three wireless communication networks depicted in FIGS. 1A through 1C, a mobile station located in one coverage area 102a may receive wireless signals from an eNB 104a within that coverage area and from another eNB 104b located within an adjacent (or partially overlapping) coverage area 102b. Those wireless signals from the two eNBs 104a, 104b may on occasion interfere with each other, reducing efficiency of wireless communication by requiring that data be resent. Coordinated multi-point transmission by the eNBs 104 improves communication efficiency by, among other things, reducing the incidences of such interference. The coverage area 104a in FIG. 1A is the "coordination area" of interest in the discussion herein.

Co-Ordinated Multi-Point Transmission (CoMP)

Coordinated Multi-Point (CoMP) transmission and reception techniques to facilitate cooperative communications across multiple transmission and reception points (e.g., cells) are currently being studied for the Long Term Evolution (LTE)-Advanced system. In CoMP operation, multiple points coordinate with each other in such a way as to improve signal quality to a user with interference avoidance and joint transmission techniques.

In efforts at standardizing the CoMP technology that allows the user equipment (UE) to receive signals from multiple transmission points (TPs) [REF4], the deployment scenarios considered are given below [REF5]:

Scenario 1: Homogeneous network with intra-site CoMP, as illustrated in FIG. 1A;
Scenario 2: Homogeneous network with high Tx power remote radio heads (RRHs), as illustrated in FIG. 1B;
Scenario 3: Heterogeneous network with low power RRHs within the macrocell coverage where the transmission/reception points created by the RRHs have different cell IDs as the macro cell, as illustrated in FIG. 1C; and
Scenario 4: Heterogeneous network with low power RRHs within the macrocell coverage where the transmission/reception points created by the RRHs have the same cell IDs as the macro cell, as also illustrated in FIG. 1C.

The CoMP schemes that have been identified as the focus for standardization are:
joint transmission;
dynamic point selection (DPS), including dynamic point blanking; and
coordinated scheduling/beamforming, including dynamic point blanking.

With each hypothesis of different CoMP transmission schemes, the network needs to know the channel quality information (CQI), pre-coding matrix indicator (PMI), and rank information (RI) supported by the UE to optimize scheduling. The feedback definitions and measurements in the current specification are defined for a single-cell transmission. Further, the individual CoMP scheme performance are characterized by other parameters, such as: the transmission points (TPs) used in the CoMP scheme; precoding applied at each of the one or more transmitting TPs; the TPs that are blanked or not transmitting; and the interference measurement resource that may be configured for measurement of individual CQIs.

Some definitions in the current specification that are relevant to the CoMP feedback definitions are discussed below.

CSI-RS Resource

In LTE Release 10, a new type of reference signal is defined, namely channel state information-reference signal (CSI-RS), to enable channel measurements to a UE, while demodulation reference symbols (DMRS) are used for demodulation with transmission mode 9 introduced in Release-10.

A UE specific CSI-RS configuration includes a non-zero power CSI-RS resource and one or more zero-power CSI-RS resource. Typically, the non-zero CSI-RS resource corresponds to the antenna elements/ports of the serving cell. Zero-power CSI-RS, also commonly referred to as muted CSI-RS, are used to protect the CSI-RS resources of another cell and a UE is expected to rate match (skip for decoding/demodulation) around these resources.

In the CSI-RS configuration details from TS 36.211, Section 6.10.5, Channel State Information (CSI) reference signals are transmitted on one, two, four or eight antenna ports using p=15, p=15, 16, p=15, ..., 18 and p=15, ..., 22, respectively. CSI reference signals are defined for $\Delta f=15$ kiloHertz (kHz) only. With respect to sequence generation, the reference-signal sequence $r_{l,n_s}(m)$ is defined by $$r_{l,n_s}(m) = \frac{1}{\sqrt{2}}(1-2\cdot c(2m)) + j\frac{1}{\sqrt{2}}(1-2\cdot c(2m+1)),$$

$$m = 0, 1, \ldots, N_{RB}^{max,DL} - 1,$$

where $n_s$ is the slot number within a radio frame and l is the Orthogonal Frequency Division Multiplexing (OFDM) symbol number with the slot. The pseudo-random sequence c(i) is defined in Section 7.2 of TS 36.211, with the pseudo-random sequence generator initialized with $$c_{init} = 2^{10}\cdot(7\cdot(n_s+1)+l+1)\cdot(2\cdot N_{ID}^{cell}+1)+2\cdot N_{ID}^{cell}+N_{CP},$$

at the start of each OFDM symbol, where $$N_{CP} = \begin{cases} 1 & \text{for normal cyclic prefix } (CP) \\ 0 & \text{for extended } CP. \end{cases}$$

With respect to mapping to resource elements, in subframe configured for CSI reference signal transmission, the reference signal sequence $r_{l,n_s}(m)$ shall be mapped to complex-valued modulation symbols $a_{k,l}^{(p)}$ used as reference symbols on antenna port p according to:

$$a_{k,l}^{(p)} = w_{l''} \cdot r_{l,n_s}(m'),$$

$$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix,} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, normal cyclic prefix,} \end{cases}$$

$$w_{l''} = \begin{cases} 1 & p \in \{15, 17, 19, 21\} \\ (-1)^{l''} & p \in \{16, 18, 20, 22\}, \end{cases}$$

$$l'' = 0, 1,$$

$$m = 0, 1, \ldots, N_{RB}^{max,DL} - 1, \text{ and}$$

$$m' = m + \left\lfloor \frac{N_{RB}^{max,DL} - N_{RB}^{DL}}{2} \right\rfloor.$$

The quantity (k',l') and the necessary conditions on $n_s$ are given by Table 6.10.5.2-1 (corresponding to TABLE I below) and Table 6.10.5.2-2 or TS 36.211 for normal and extended cyclic prefix, respectively.

TABLE I (Table 6.10.5.2-1 of TS 36.211): Mapping from CSI reference signal configuration to (k', l') for normal cyclic prefix.

| | | Number of CSI reference signals configured | | | | | |
|---|---|---|---|---|---|---|---|
| | | 1 or 2 | | 4 | | 8 | |
| CSI reference signal configuration | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |

TABLE I-continued (Table 6.10.5.2-1 of TS 36.211): Mapping from CSI reference signal configuration to (k', l') for normal cyclic prefix.

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type 2 only | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE II (Table 6.10.5.2-2 of TS 36.211): Mapping from CSI reference signal configuration to (k', l') for extended cyclic prefix.

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame | 0 | (11, 4) | 0 | (11, 4) | 0 | (11, 4) | 0 |
| structure | 1 | (9, 4) | 0 | (9, 4) | 0 | (9, 4) | 0 |
| type 1 and 2 | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame | 16 | (11, 1) | 1 | (11, 1) | 1 | (11, 1) | 1 |
| structure | 17 | (10, 1) | 1 | (10, 1) | 1 | (10, 1) | 1 |
| type 2 only | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Multiple CSI reference signal configurations can be used in a given cell, which may include:

zero or one configuration for which the UE shall assume non-zero transmission power for the CSI-RS, and zero or more configurations for which the UE shall assume zero transmission power.

For each bit set to one in the 16-bit bitmap ZeroPower-CSI-RS configured by higher layers, the UE shall assume zero transmission power for the resource elements corresponding to the four CSI reference signal column in Tables I and II for normal and extended cyclic prefix, respectively, except for resource elements that overlap with those for which the UE shall assume non-zero transmission power CSI-RS as configured by higher layers. The most significant bit corresponds to the lowest CSI reference signal configuration index and subsequent bits in the bitmap correspond to configurations with indices in increasing order.

CSI reference signals can only occur in:

downlink slots where $n_s$ mod 2 fulfills the condition in Tables I and II for normal and extended cyclic prefix, respectively, and where the subframe number fulfills the conditions in Section I of TS II.

The UE shall assume that CSI reference signals are not be transmitted:

in the special subframe(s) in case of frame structure type 2, in subframes where transmission of a CSI-RS would collide with transmission of synchronization signals, the Physical Broadcast CHannel (PBCH), or SystemInformationBlockType1 messages, or in subframes configured for transmission of paging messages.

Resource elements (k,l) used for transmission of CSI reference signals on any of the antenna ports in the set S, where S={15}, S={15,16}, S={17,18}, S={19,20} or S={21,22} shall:

not be used for transmission of PDSCH on any antenna port in the same slot, and not be used for CSI reference signals on any antenna port other than those in S in the same slot.

Figure 2A:
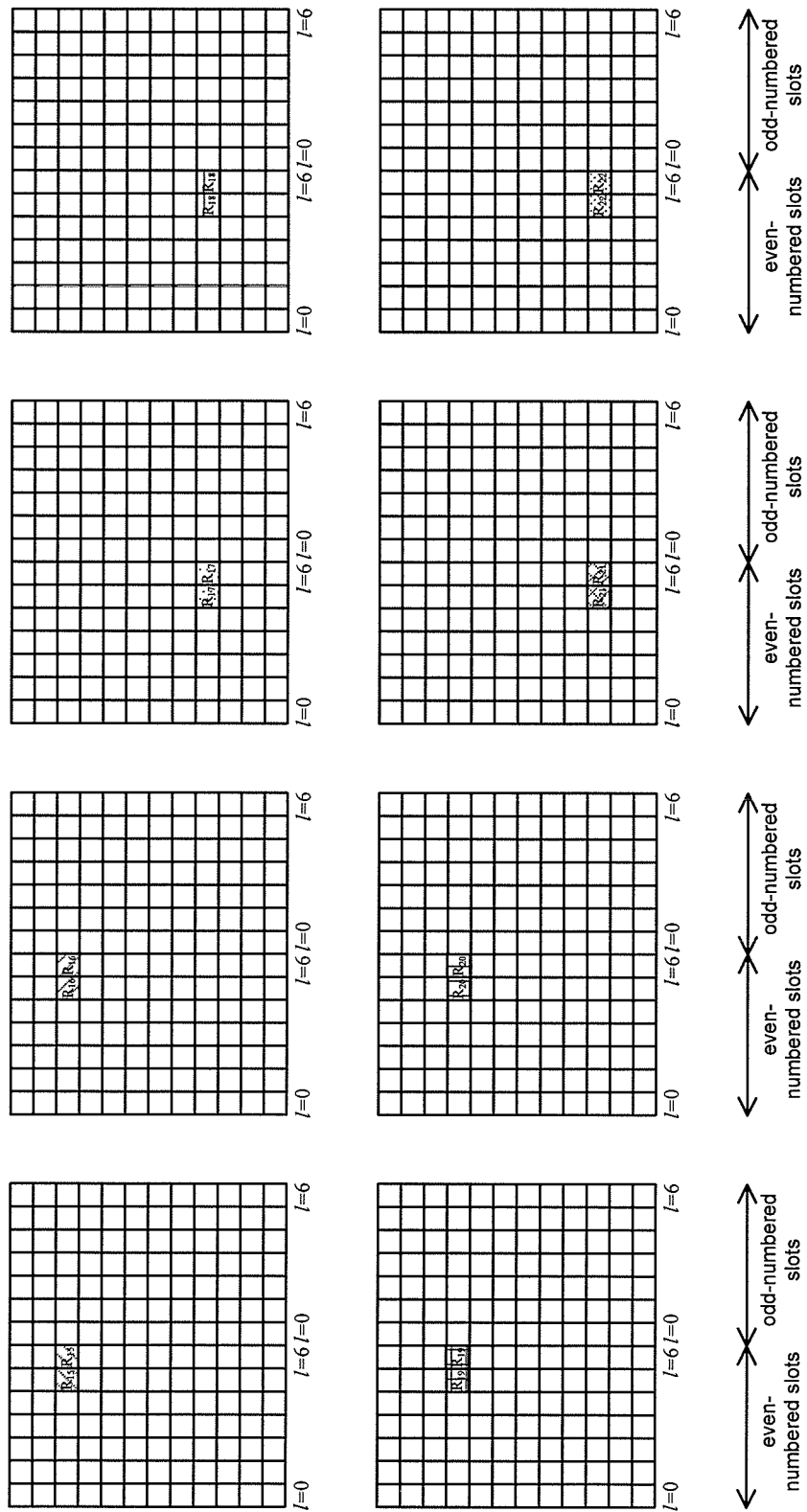
FIGS. 2A and 2B illustrate channel state information reference signal configuration that may be employed for CSI feedback for coordinated multi-point transmission implemented according to one or more embodiments of the present disclosure.
Figure 2B:
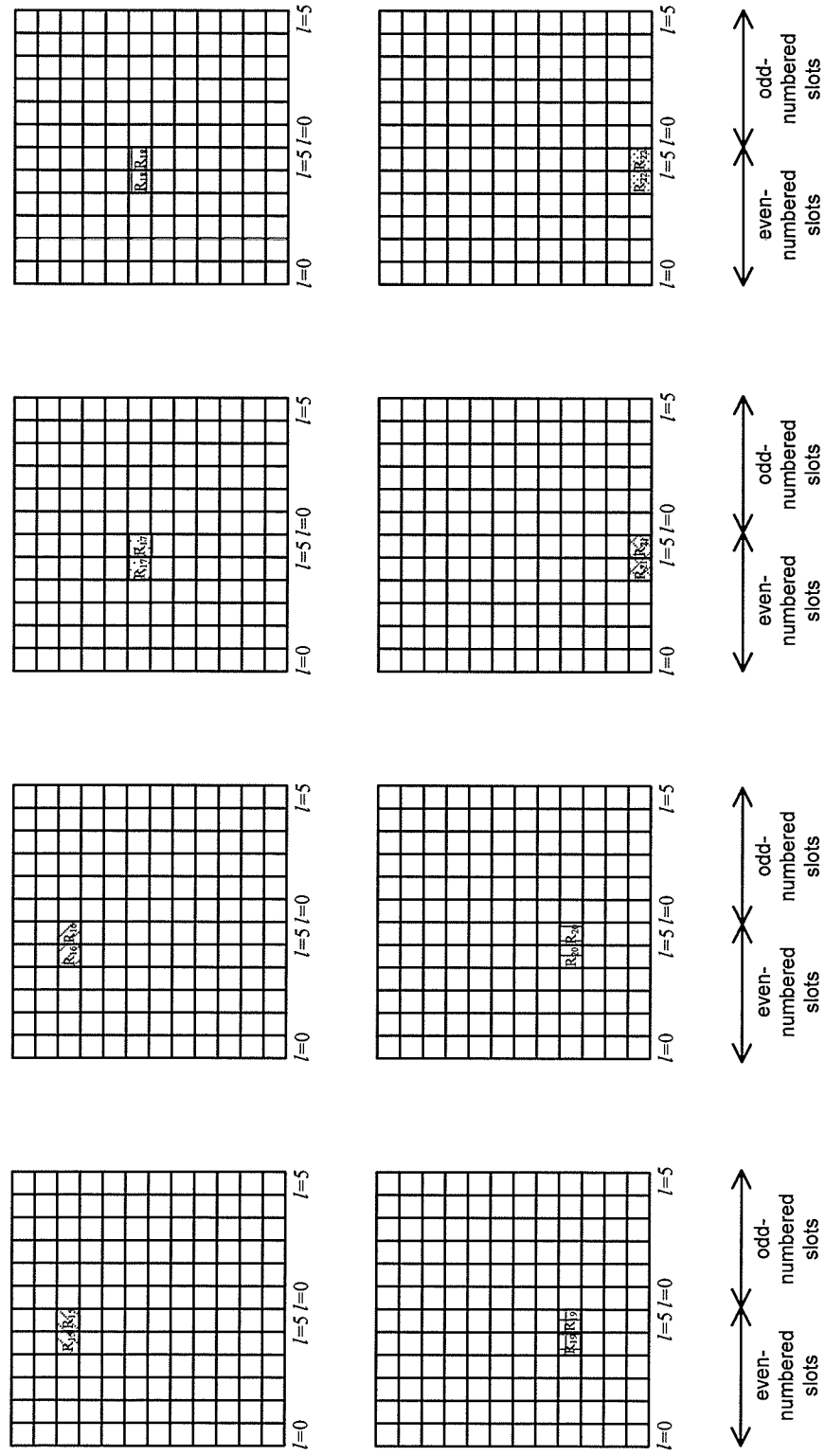
Figure 6:
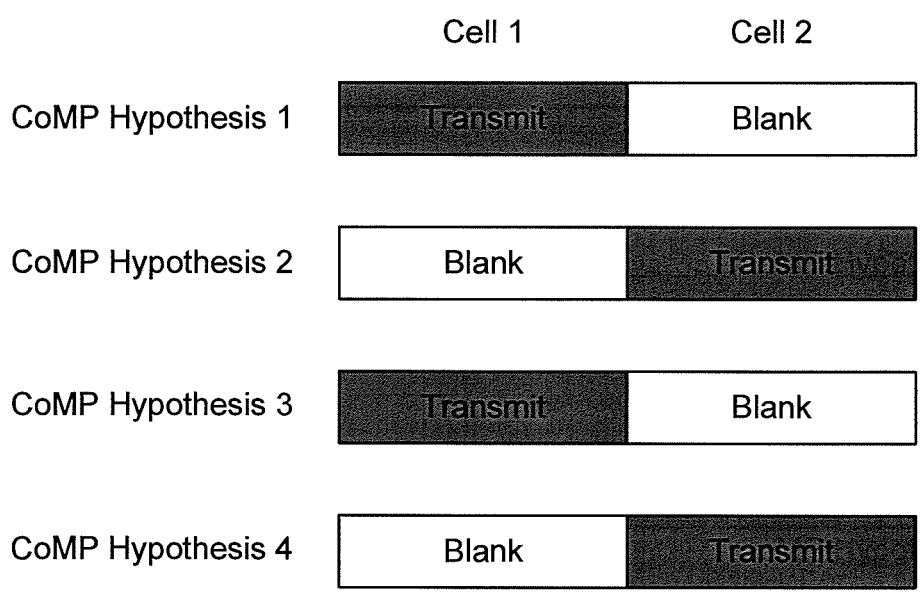
FIG. 6 illustrates four different CoMP transmission hypotheses which could allow DPS/DE or JT transmission for the CoMP between two cells for coordinated multi-point transmission implemented according to one or more embodiments of the present disclosure.

The mapping for CSI reference signal configuration 0 (comprising reference signals $R_{15}$, $R_{16}$, $R_{17}$, $R_{18}$, $R_{19}$, $R_{20}$, $R_{21}$ and $R_{22}$) to resource elements of various slots in a subframe for normal and extended cyclic prefixes, respectively, is illustrated in FIGS. 2A and 2B, corresponding to Figures 6.10.5.2-1 and 6.10.5.2-2 of TS 36.211.

CSI Reference Signal Subframe Configuration (Section 6.10.5.3 of TS 36.211)

The subframe configuration period $T_{CSI-RS}$ and the subframe offset $\Delta_{CSI-RS}$ for the occurrence of CSI reference signals are listed in Table 6.10.5.3-1 of TS 36.211. The parameter $I_{CSI-RS}$ can be configured separately for CSI reference signals for which the UE shall assume non-zero and zero transmission power. Subframes containing CSI reference signals shall satisfy $(10n_f+\lfloor n_s/2 \rfloor - \Delta_{CSI-RS}) \bmod T_{CSI-RS}=0,$ where $n_f$ is the system frame number.

TABLE III (Table 6.10.5.3-1 of TS 36.211): CSI reference signal subframe configuration.

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

The following is specified in TS 36.213 for UE assumptions on CSI-RS: With respect to CSI-RS definition, the following parameters for CSI-RS are configured via higher layer signaling:

Number of CSI-RS ports. The allowable values and port mapping are given in Section 6.10.5 of [REF1].

CSI-RS Configuration (see Table I and Table II, corresponding to tables in [REF1])

CSI-RS subframe configuration $I_{CSI-RS}$. The allowable values are given in Section 6.10.5.3 of [REF1].

Subframe configuration period $T_{CSI-RS}$. The allowable values are given in Section 6.10.5.3 of [REF1].

Subframe offset $\Delta_{CSI-RS}$. The allowable values are given in Section 6.10.5.3 of [REF1].

With respect to UE assumptions on reference Physical Downlink Shared CHannel (PDSCH) transmitted power $P_c$ for CSI feedback, $P_c$ is the assumed ratio of PDSCH energy per resource element (EPRE) to CSI-RS EPRE when UE derives CSI feedback and takes values in the range of [−8, 15] dB with 1 dB step size, where the PDSCH EPRE corresponds to the symbols for which the ratio of the PDSCH EPRE to the cell-specific RS EPRE is denoted by $\rho_A$, as specified in Table 5.2-2 and Table 5.2-3 of REF3.

A UE should not expect the configuration of CSI-RS and/or zero-power CSI-RS and Physical Multicast CHannel (PMCH) in the same subframe of a serving cell.

To support CoMP transmission, a network needs feedback corresponding to multiple transmission points or cells. So, a network can set-up multiple CSI-RS resources, each typically corresponding to a TP. Unless otherwise stated, "CSI-RS resource" and "TP" are used interchangeably herein. Further details of CSI-RS resource configurations and the configurable parameters for each CSI-RS resource are captured below.

CSI-RS (Agreement from RAN1 #68bis)

Configuration of multiple non-zero-power CSI-RS resources includes at least:

AntennaPortsCount

ResourceConfig

SubframeConfig

Pc

Parameter X to derive scrambling initialization (Note: X ranges from 0 to 503, can be interpreted as virtual cell identifier. In Rel-10, X is just the Physical Cell Identifier (PCI) of the serving cell.)

$c_{init}=2^{10} \cdot (7 \cdot (n_s+1)+l+1) \cdot (2 \cdot X+1) \cdot 2 \cdot X+N_{CP}$ These parameters are configured per CSI-RS resource Whether some parameters can be configured per CSI-RS port considering the decision of supporting coherent joint transmission by the aggregate CSI feedback corresponding to multiple TPs in one CSI-RS resource has been under further study.

While the CSI-RS resources capture channels of individual TPs, the interference measurement also depends on the CoMP scheme. In Release8/10, a single interference measurement resource is used, which is the Common Reference Signal (CRS) itself. Interference measurement on the CRS captures all the interference outside the cell.

For CoMP, one or more interference measurement resources can be defined to capture the interference for a hypothetical CoMP scheme. A recent agreement according to chairman notes at 3GPP RAN1 meeting #68 bis is provided below, Interference Measurement Resource (Agreement from RAN1 #68bis):

At least one Interference Measurement Resource (IMR) can be configured for a Rel-11 UE.

Whether a maximum of only one or multiple IMRs can be configured for a Rel-11 UE has been under further study.

Each IMR consists of only resource elements (REs) that can be configured as Rel-10 CSI-RS resources.

Whether REs of an IMR are allowed to be configured as non-zero-power CSI-RS resources has been under further study, and is whether an IMR can have finer granularity than 4 REs per physical resource block (PRB).

CSI Configuration

For support of CoMP, new CSI-RS configurations need to be defined and signaled by higher layers and new CSI processes implemented, where a CSI process is a combination of a non-zero power (NZP) CSI-RS resource and an interference measurement resource (IMR). Some methods for accomplishing those results are discussed below. In Release-10, CSI-RS configuration is signaled as indicating by the following pseudo-code, where a single non-zero power CSI-RS and its parameters are indicated, while multiple zero-power CSI-RS configurations are indicated using a bitmap:

CSI-RS-Config Information Elements [T36.331]

With one or more interference measurement resources supported for CoMP, CSI measurement is based on both a CSI-RS resource and an Interference Measurement Resource (IMR). Hence, to set-up feedback, a CSI configuration could be defined. Some methods for achieving that are discussed below.

In one method, if the UE is configured with multiple IMR resources, the CSI configurations can be defined as follows, each with an associated (CSI-RS resource index, IMR resource index) pair:

TABLE IV

| CSI Configuration | CSI-RS Resource Index | IMR Resource Indices |
|---|---|---|
| Configuration 1 | X1 | Y1 |
| Configuration 2 | X2 | Y2 |

Example 1

In one method illustrated by the pseudo-code below, IMR resource index could be based on one of the currently defined 16 CSI-RS resource configurations that are used for zero-power CSI-RS in Release-10 based on a 4 transmitter (Tx) CSI-RS pattern (using the four CSI reference signal column in Table 6.10.5.2-1 of TS 36.211):

```
-- ASN1START
CSI-RS-Config-r10 ::=    SEQUENCE {
    csi-RS-r10               CHOICE {
        release                  NULL,
        setup                    SEQUENCE {
            antennaPortsCount-r10      ENUMERATED {an1, an2, an4, an8},
            resourceConfig-r10         INTEGER (0..31),
            subframeConfig-r10         INTEGER (0..154),
            p-C-r10                    INTEGER (-8..15)
        }
    }                                       OPTIONAL,            -- Need ON
    zeroTxPowerCSI-RS-r10    CHOICE {
        release                  NULL,
        setup                    SEQUENCE {
            zeroTxPowerResourceConfigList-r10    BIT STRING (SIZE (16)),
            ZeroTxPowerSubframeConfig-r10        INTEGER (0..154)
        }
    }                                       OPTIONAL             -- Need ON
}
-- ASN1STOP
```

```
-- ASN1START
CSI-Config-r11 ::=   SEQUENCE {
        csi-RS-r11              CHOICE {
               release                  NULL,
               setup                    SEQUENCE {
                       antennaPortsCount-r11              ENUMERATED {an1, an2, an4, an8},
                       resourceConfig-r11                 INTEGER (0..31),
                       subframeConfig-r11                 INTEGER (0..154),
                       p-C-r11                            INTEGER (-8..15)
                   IMR-resourceConfigr-r11                INTEGER (0..15)
                   IMRSubframeConfig-r11                  INTEGER (0..154)
               }
        }                                    OPTIONAL,            -- Need ON
}
-- ASN1STOP
```

In another method illustrated by the pseudo-code below, an antenna port count can be additionally indicated to allow configuration of any of the 1, 2, 4 or 8 Tx patterns:

```
-- ASN1START
CSI-Config-r11 ::=   SEQUENCE {
        csi-RS-r11              CHOICE {
               release                  NULL,
               setup                    SEQUENCE {
                       antennaPortsCount-r11              ENUMERATED {an1, an2, an4, an8},
                       resourceConfig-r11                 INTEGER (0..31),
                       subframeConfig-r11                 INTEGER (0..154),
                       p-C-r11                            INTEGER (-8..15)
                   IMR-antennaPortsCount-r11              ENUMERATED {an1, an2, an4, an8}
                   IMR-resourceConfigr-r11                INTEGER (0..15)
                   IMRSubframeConfig-r11                  INTEGER (0..154)
               }
        }                                    OPTIONAL,            -- Need ON
}
-- ASN1STOP
```

In another method illustrated by the pseudo-code below, instead of indicating antenna port count the configuration of any of the 1 or 2, 4, 8 Tx patterns can be allowed by using an aggregate bit field, i.e, a single bitfield to indicate a total of 32 (1 or 2 Tx)+16 (4 Tx)+8 (8 Tx)=56 patterns:

```
-- ASN1START
CSI-Config-r11 ::=   SEQUENCE {
        csi-RS-r11              CHOICE {
               release                  NULL,
               setup                    SEQUENCE {
                       antennaPortsCount-r11              ENUMERATED {an1, an2, an4, an8},
                       resourceConfig-r11                 INTEGER (0..31),
                       subframeConfig-r11                 INTEGER (0..154),
                       p-C-r10                            INTEGER (-8..15)
                   IMR-resourceConfigr-r11                INTEGER (0..56)
                   IMRSubframeConfig-r11                  INTEGER (0..154)
               }
        }                                    OPTIONAL,            -- Need ON
}
-- ASN1STOP
```

Multiple such CSI configurations/processes can be defined for a UE for CSI feedback purpose. A given CSI process can be used by periodic and/or aperiodic reporting. Each of the CSI processes could correspond to both periodic and aperiodic CSI feedback or separate processes may be defined for this purpose.

Example 2

In another method, a single IMR resource can be configured, while the multiple CSI-RS resources are configured separately. In this case, each CSI-RS configuration is defined by the associated CSI-RS resource and at least the common IMR resource as illustrated by the pseudo-code segment below:

```
IMR-CSI-RS-r11      CHOICE {
        release         NULL,
        setup           SEQUENCE {
                IMRResourceConfig-r11       INTEGER (0..15)
                IMRSubframeConfig-r11       INTEGER (0..154)
        }
}
```

The whole set of configurations (1, 2, 4, 8Tx) patterns may be using either an antennaportscount parameter or an aggregate IMRresourceconfig parameters as illustrated by the two pseudo-code segments below:

```
IMR-CSI-RS-r11      CHOICE {
        release         NULL,
        setup           SEQUENCE {
                IMR-antennaPortsCount-r11   ENUMERATED
                                            {an1, an2, an4, an8},
                IMRResourceConfig-r11       INTEGER (0..15)
                IMRSubframeConfig-r11       INTEGER (0..154)
        }
}
```

```
IMR-CSI-RS-r11      CHOICE {
        release         NULL,
        setup           SEQUENCE {
                IMRResourceConfig-r11       INTEGER (0..56)
                IMRSubframeConfig-r11       INTEGER (0..154)
        }
}
```

In one method, one or more IMR resources may be configured using the definitions above.

In one method, a list of IMR resources can be setup using a single field using by replacing
  IMR-resourceConfigr-r11 INTEGER (0 . . . X)
with
  IMR-resourceConfigr-r11 BIT STRING (SIZE(16))

In another method, the interference measurement hypothesis could be based on at least one IMR resource and at least one non-zero power CSI-RS resource. In this case, the UE is expected to measure interference on an IMR resource by just summing or averaging the received signal power contribution of corresponding REs. For deriving the interference measurement component from a non-zero power CSI-RS resource, the UE performs channel estimation and derives the interference power based on the sum or average power of the CSI-RS ports corresponding to the non-zero-power CSI-RS resource.

An example is shown below with an IMR resource Y as configured in Example 2 above. Such CSI configuration may be setup differently for periodic and aperiodic feedback modes.

TABLE V

| CSI Configuration | CSI-RS Resource Index | IMR Resource configuration (IMR Resource Index, Non Zero Power CSI-RS Resource Configuration Index) |
|---|---|---|
| Configuration 1 | X1 | (Y, Z1) |
| Configuration 2 | X2 | (Y, Z2) |

The non-zero CSI-RS (Z1,Z2) resources used may be implicitly known based on the feedback mode or explicitly configured as in the table above.

In one method for implicit configuration, the non-zero power resources (Z1) used for interference measurement may include some or all of the non-zero power CSI-RS configured for that UE.

In one method, the non-zero power CSI-RS resources used for interference measurement for a CSI configuration may be implicitly based on the corresponding CSI-RS resource index (X1 for configuration 1). An example of such a method would be that the non-zero power resources (Z1) used for interference measurement are all the configured CSI-RS resources for that UE except X1.

In another method, the non-zero power resources (Z1) used for interference measurement could be all the CSI-RS resources configured for that UE except those corresponding to the CSI configurations for that UE (i.e., X1,X2). Typically (X1,X2) can be considered a reporting set, while X1 can be considered a transmission set for CSI purposes.

In one method, the PDSCH is not mapped to the REs corresponding to the configured IMR resource(s). The rules for PDSCH mapping to resource elements are currently outlined in Section 6.3.5 of TS36.211 with the modifications indicated below:

Mapping to Resource Elements

For each of the antenna ports used for transmission of the physical channel, the block of complex-valued symbols $y^{(p)}(0), \ldots, y^{(p)}(M_{symb}^{ap})$ shall conform to the downlink power allocation specified in Section 5.2 in [REF4] and be mapped in sequence starting with $y^{(p)}(0)$ to resource elements (k.l) which meet all of the following criteria:

they are in the physical resource blocks corresponding to the virtual resource blocks assigned for transmission, and they are not used for transmission of PBCH, synchronization signals, cell-specific reference signals, multi-broadcast single frequency network (MBSFN) reference signals or UE-specific reference signals, and they are not used for transmission of CSI reference signals and the downlink control information (DCI) associated with the downlink transmission uses the cell radio network temporary identifier (C-RNTI) or semi-persistent C-RNTI, and (new criteria) they are not used for transmission of IMR reference signals and the DCI associated with the downlink transmission uses the C-RNTI or semi-persistent C-RNTI, and the index l in the first slot in a subframe fulfills $l \geq l_{DataStart}$ where $l_{DataStart}$ is given by Section 7.1.6.4 of [REF4].

New CQI Definition

Corresponding to the new CSI and IMR configurations, new CQI definitions must be established. In one method, the CQI definition is modified as follows:

In the CSI reference resource, the UE shall assume the following for the purpose of deriving the CQI index, and if also configured, PMI and RI:

The first 3 OFDM symbols are occupied by control signaling

No resource elements used by primary or secondary synchronization signals or PBCH CP length of the non-MBSFN subframes Redundancy Version 0

If CSI-RS is used for channel measurements, the ratio of PDSCH EPRE to CSI-RS EPRE is as given in Section 7.2.5 of [REF3]

For transmission mode x CSI reporting:

CRS REs are as in non-MBSFN subframes;

If the UE is configured for PMI/RI reporting, the UE-specific reference signal overhead is consistent with the most recent reported rank; and PDSCH signals on antenna ports $\{7, \ldots 6+v\}$ for v layers would result in signals equivalent to corresponding symbols transmitted on (new criteria) antenna ports $\{a_1, \ldots a_p\}$ of the CSI-RS resource, as given by $$\begin{bmatrix} y^{a_1} \\ \vdots \\ y^{a_p} \end{bmatrix} = W(i) \begin{bmatrix} x^{(0)}(i) \\ \vdots \\ x^{(v-1)}(i) \end{bmatrix},$$

where $x(i)=[x^{(0)}(i), \ldots x^{(v-1)}(i)]^T$ is a vector of symbols from the layer mapping in section 6.3.3.2 of [REF3], $P \in \{1, 2, 4, 8\}$ is the number of CSI-RS ports (new criteria) configured for the CSI-RS resource, and if only one CSI-RS port is configured, W(i) is 1, otherwise W(i) is the precoding matrix corresponding to the reported PMI applicable to x(i). The corresponding PDSCH signals transmitted on (new criteria) antenna ports $\{a_1, \ldots a_p\}$ would have a ratio of EPRE to CSI-RS EPRE equal to the ratio given in section 7.2.5 of [REF3].

(new criteria) If IMR based interference measurement is configured for the UE (new criteria) Assume the interference is the sum of interference observed on the IMR resource and one or more non-zero power CSI-RS resources configured for the CQI measurement (i.e., associated with the CSI request or higher layer configuration), where the individual contributions are obtained as, (new criteria) For interference measurement based on a non-zero power CSI-RS resource, the interference is based on the [average] received power on the reference signals corresponding to the CSI-RS antenna ports of the CSI-RS resource.

(new criteria) For interference measurement based on an IMR resource, the interference measurement is the total power (or average power) observed on the REs corresponding to the IMR resource.

Assume no REs allocated for CSI-RS and zero-power CSI-RS and IMR resources

Assume no REs allocated for PRS

The PDSCH transmission scheme given by Table 7.2.3-0 depending on the transmission mode currently configured for the UE (which may be the default mode).

In one method, the interference measurement is only performed if an IMR resource is configured by higher layers. In this case, the condition for interference measurement in the CQI definition can be modified as, (new criteria) If at least one IMR resource is configured by higher layers for the UE, In another method, if the CSI configuration corresponding to the CQI requested as part of a periodic feedback mode or an aperiodic CSI request has a configured IMR resource, then interference measurement may be defined with the condition (new criteria) If at least one IMR resource is configured as part of the periodic CSI configuration or aperiodic CSI request If interference measurement based on a non-zero power CSI-RS resource is not supported, then the text in the CQI definition can be modified as follows, (new criteria) If IMR based interference measurement is configured for the UE (new criteria) Assume the interference is based on an IMR resource, where the interference is the total power (or average power) observed on the REs corresponding to the IMR resource.

The same modifications outlined before can be applied to this case as well for the condition to trigger IMR based interference assumption.

With the new definitions for multiple CSI (or CSI processes) and/or IMR configurations, some methods for periodic feedback modes based on Physical Uplink Control CHannel (PUCCH) are also described.

Periodic Feedback Modes on PUCCH

Periodic feedback modes are based on semi-persistent configuration of uplink control information on PUCCH channel. They are configured with a certain periodicity and offset. The supported feedback modes, individual report types and timing configuration (periodicity,offset) are summarized below from the 3GPP specification 36.213.

TABLE VI

Table 7.2.2-1: CQI and PMI Feedback Types for PUCCH CSI reporting Modes [36.213]

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

The following CQI/PMI and RI reporting types with distinct periods and offsets are supported for the PUCCH CSI reporting modes given in Table 7.2.2-3:

Type 1 report supports CQI feedback for the UE selected sub-bands

Type 1a report supports subband CQI and second PMI feedback

Type 2, Type 2b, and Type 2c report supports wideband CQI and PMI feedback
Type 2a report supports wideband PMI feedback
Type 3 report supports RI feedback
Type 4 report supports wideband CQI
Type 5 report supports RI and wideband PMI feedback
Type 6 report supports RI and PTI feedback $-(N_{pd}-1)\}$. If a UE is configured to report for more than one CSI subframe set then parameter cqi-pmi-ConfigIndex and ri-ConfigIndex respectively correspond to the CQI/PMI and RI periodicity and relative reporting offset for subframe set 1 and cqi-pmi-ConfigIndex2 and ri-ConfigIndex2 respectively correspond to the CQI/PMI and RI periodicity and relative reporting offset for subframe set 2.

TABLE VII

Table 7.2.2-3: PUCCH Reporting Type Payload size per PUCCH Reporting Mode and Mode State

| PUCCH Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 4 + L | NA | 4 + L |
|  |  | RI > 1 | NA | 7 + L | NA | 4 + L |
| 1a | Sub-band CQI/second PMI | 8 antenna ports RI = 1 | NA | 8 + L | NA | NA |
|  |  | 8 antenna ports 1 < RI < 5 | NA | 9 + L | NA | NA |
|  |  | 8 antenna ports RI > 4 | NA | 7 + L | NA | NA |
| 2 | Wideband CQI/PMI | 2 antenna ports RI = 1 | 6 | 6 | NA | NA |
|  |  | 4 antenna ports RI = 1 | 8 | 8 | NA | NA |
|  |  | 2 antenna ports RI > 1 | 8 | 8 | NA | NA |
|  |  | 4 antenna ports RI > 1 | 11 | 11 | NA | NA |
| 2a | Wideband first PMI | 8 antenna ports RI < 3 | NA | 4 | NA | NA |
|  |  | 8 antenna ports 2 < RI < 8 | NA | 2 | NA | NA |
|  |  | 8 antenna ports RI = 8 | NA | 0 | NA | NA |
| 2b | Wideband CQI/second PMI | 8 antenna ports RI = 1 | 8 | 8 | NA | NA |
|  |  | 8 antenna ports 1 < RI < 4 | 11 | 11 | NA | NA |
|  |  | 8 antenna ports RI = 4 | 10 | 10 | NA | NA |
|  |  | 8 antenna ports RI > 4 | 7 | 7 | NA | NA |
| 2c | Wideband CQI/first PMI/second PMI | 8 antenna ports RI = 1 | 8 | NA | NA | NA |
|  |  | 8 antenna ports 1 < RI ≤ 4 | 11 | NA | NA | NA |
|  |  | 8 antenna ports 4 < RI ≤ 7 | 9 | NA | NA | NA |
|  |  | 8 antenna ports RI = 8 | 7 | NA | NA | NA |
| 3 | RI | 2/4 antenna ports, 2-layer spatial multiplexing | 1 | 1 | 1 | 1 |
|  |  | 8 antenna ports, 2-layer spatial multiplexing | 1 | NA | NA | NA |
|  |  | 4 antenna ports, 4-layer spatial multiplexing | 2 | 2 | 2 | 2 |
|  |  | 8 antenna ports, 4-layer spatial multiplexing | 2 | NA | NA | NA |
|  |  | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
|  |  | 8 antenna ports, 4 and 8-layer spatial multiplexing | 5 | NA | NA | NA |
| 6 | RI/PTI | 8 antenna ports, 2-layer spatial multiplexing | NA | 2 | NA | NA |
|  |  | 8 antenna ports, 4-layer spatial multiplexing | NA | 3 | NA | NA |
|  |  | 8 antenna ports, 8-layer spatial multiplexing | NA | 4 | NA | NA |

For each serving cell, the periodicity $N_{pd}$ (in subframes) and offset $N_{OFFSET,CQI}$ (in subframes) for CQI/PMI reporting are determined based on the parameter cqi-pmi-ConfigIndex ($I_{CQI/PMI}$) given in Table 7.2.2-1A for frequency division duplexing (FDD) and Table 7.2.2-1C for time division duplexing (TDD). The periodicity $M_{RI}$ and relative offset $N_{OFFSET,RI}$ for RI reporting are determined based on the parameter ri-ConfigIndex ($I_{RI}$) given in Table 7.2.2-1B. Both cqi-pmi-ConfigIndex and ri-ConfigIndex are configured by higher layer signaling. The relative reporting offset for RI $N_{OFFSET,RI}$ takes values from the set $\{0, -1, \ldots,$

TABLE VIII

Table 7.2.2-1A: Mapping of $I_{CQI/PMI}$ to $N_{pd}$ and $N_{OFFSET,CQI}$ for FDD.

| $I_{CQI-PMI}$ | Value of $N_{pd}$ | Value of $N_{OFFSET,CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |

TABLE VIII-continued

Table 7.2.2-1A: Mapping of $I_{CQI/PMI}$ to $N_{pd}$ and $N_{OFFSET,CQI}$ for FDD.

| $I_{CQI-PMI}$ | Value of $N_{pd}$ | Value of $N_{OFFSET, CQI}$ |
|---|---|---|
| $77 \le I_{CQI/PMI} \le 156$ | 80 | $I_{CQI/PMI} - 77$ |
| $157 \le I_{CQI/PMI} \le 316$ | 160 | $I_{CQI/PMI} - 157$ |
| $I_{CQI/PMI} = 317$ | | Reserved |
| $318 \le I_{CQI/PMI} \le 349$ | 32 | $I_{CQI/PMI} - 318$ |
| $350 \le I_{CQI/PMI} \le 413$ | 64 | $I_{CQI/PMI} - 350$ |
| $414 \le I_{CQI/PMI} \le 541$ | 128 | $I_{CQI/PMI} - 414$ |
| $542 \le I_{CQI/PMI} \le 1023$ | | Reserved |

TABLE IX

Table 7.2.2-1B: Mapping of $I_{RI}$ to $M_{RI}$ and $N_{OFFSET, RI}$.

| $I_{RI}$ | Value of $M_{RI}$ | Value of $N_{OFFSET, RI}$ |
|---|---|---|
| $0 \le I_{RI} \le 160$ | 1 | $-I_{RI}$ |
| $161 \le I_{RI} \le 321$ | 2 | $-(I_{RI} - 161)$ |
| $322 \le I_{RI} \le 482$ | 4 | $-(I_{RI} - 322)$ |
| $483 \le I_{RI} \le 643$ | 8 | $-(I_{RI} - 483)$ |
| $644 \le I_{RI} \le 804$ | 16 | $-(I_{RI} - 644)$ |
| $805 \le I_{RI} \le 965$ | 32 | $-(I_{RI} - 805)$ |
| $966 \le I_{RI} \le 1023$ | | Reserved |

TABLE X

Table 7.2.2-1C: Mapping of $I_{CQI/PMI}$ to $N_{pd}$ and $N_{OFFSET,CQI}$ for TDD.

| $I_{CQI/PMI}$ | Value of $N_{pd}$ | Value of $N_{OFFSET, CQI}$ |
|---|---|---|
| $I_{CQI/PMI} = 0$ | 1 | $I_{CQI/PMI}$ |
| $1 \le I_{CQI/PMI} \le 5$ | 5 | $I_{CQI/PMI} - 1$ |
| $6 \le I_{CQI/PMI} \le 15$ | 10 | $I_{CQI/PMI} - 6$ |
| $16 \le I_{CQI/PMI} \le 35$ | 20 | $I_{CQI/PMI} - 16$ |
| $36 \le I_{CQI/PMI} \le 75$ | 40 | $I_{CQI/PMI} - 36$ |
| $76 \le I_{CQI/PMI} \le 155$ | 80 | $I_{CQI/PMI} - 76$ |
| $156 \le I_{CQI/PMI} \le 315$ | 160 | $I_{CQI/PMI} - 156$ |
| $316 \le I_{CQI/PMI} \le 1023$ | | Reserved |

As an example, the wideband CQI/PMI reporting timing is defined as follows based on configured timing parameters. Similar definitions are defined in 36.213 for other report types.

In the case where wideband CQI/PMI reporting is configured:

The reporting instances for wideband CQI/PMI are subframes satisfying $(10 \times n_f + \lfloor n_s/2 \rfloor - N_{OFFSET,CQI}) \bmod N_{pd} = 0$.

In case RI reporting is configured, the reporting interval of the RI reporting is an integer multiple $M_{RI}$ of period $N_{pd}$ (in subframes).

The reporting instances for RI are the subframes that satisfy: $(10 \times n_f + \lfloor n_s/2 \rfloor - N_{OFFSET,CQI} - N_{OFFSET,RI}) \bmod (N_{pd} \cdot M_{RI}) = 0$.

To support CoMP transmissions, feedback must be set up corresponding to more than one CSI-RS configuration (or resources) (TP), and new feedback modes need to be defined for this purpose. Some options are discussed below, with "CSI configuration" used to mean a (CSI-RS resource, IMR resource) pair. However it will be understood that with any single IMR resource, a CSI configuration may be simply replaced by the CSI-RS resource.

Option 1: Independent Periodic PUCCH for Multiple CSI Configurations

With this option, the periodic feedback mode parameters are set up independently for two or more CSI configurations. This option is suitable for example, when no inter-CSI-RS feedback is needed. Inter-CSI-RS resource feedback refers to feedback which relies on measurement of more than one CSI-RS resource. Some examples of inter-CSI-RS resource feedback will be discussed later.

When two or more periodic reports are configured, the timing parameters chosen may result in collision of certain reports. Such collision may be avoidable sometimes by appropriate choice of parameters by the scheduler, but is not always possible due to scheduling flexibility issues. There are different ways to handle such a collision, some of which are discussed below. It is noted that the methods and embodiments below can also apply to UEs configured with multiple component carriers when two or more periodic CSI reporting instances for the multiple component carriers are scheduled in a same subframe. Further, the methods and rules may be applied in any order for collision resolution.

Only one of the reports may be sent and remaining reports could be dropped (not transmitted). In this case some dropping rules must be defined, which are clear to both the UE and the evolved Node B (eNB).

Embodiment 1

Dropping Some Reports Using Dropping Rules

In case of collision between two PUCCH reports for different CSI-RS resources, drop the feedback based on:

1. Report Type

In one embodiment, the report to be transmitted is selected based on the report type. For example, a rank (RI) report may be considered more useful than other CQI/PMI reports, and a wideband CQI/PMI report may be prioritized over a subband CQI/PMI report. In such a case, a priority order is defined for each report. So as an example, reporting types 3, 5, or 6 may have higher priority over reporting types 1, 1a, 2, 2a, 2b, 2c, or 4. Thus, if a report type for a first CSI-RS resource is type 3 and report type for a second CSI-RS resource is type 1, then the report corresponding to first CSI-RS resource is prioritized to be sent.

2. CSI-RS Transmission

As defined before, each CSI-RS resource has a unique subframe configuration (see previous description) parameterized by a periodicity and timing offset when the corresponding CSI-RS are sent. In one method, the reports corresponding to different CSI-RS resources are prioritized based on the timing relationship with past CSI-RS transmissions of the corresponding resources. In one method, the report corresponding to the CSI-RS resource with the most recent CSI-RS transmission is prioritized, since the corresponding CSI is more useful (considering time variation of CSI).

3. CSI-RS Resource with Best Performance

In one method, the report corresponding to the CSI-RS resource is prioritized based on the performance attributed to the CSI-RS resource. In one method, the prioritization could be based on CQI (wideband or subband). Since the network may not be aware of the current CQI, in one method, an index of the chosen CSI-RS resource is reported. In another method, to avoid additional reporting, the prioritization could be based on the most recently reported wideband CQI of each report.

In another method other feedback parameters may also be used like RI as a performance metric.

In one method, the choice of the CSI-RS for reporting could be based on the corresponding RSRP or RSRQ, if an RSRP type metric can be associated with a CSI-RS configuration. Such RSRP may be separately reported by the UE and known to eNB.

4. CSI-RS Resource Index

In one method, the prioritization of a report corresponding to a CSI-RS resource could be simply based on the CSI-RS resource index. Multiple CSI-RS resources are configured by RRC (higher layer) signaling, thereby implicitly associating an index (from the signaled order) to each of the CSI-RS resources. This would allow the network to prioritize a CSI-RS resource by network configuration. Such prioritization/indexing could be effected by the scheduling aspects and/or signal strength measured by the network for the corresponding CSI-RS resource.

5. Reporting Mode Parameters

In one method, the prioritization of the reports is based on the feedback mode setup parameters like periodicity and offset (Npd,Noffset).

Embodiment 2

Multiplexing the Reports

In one method, when the multiple CSI reports corresponding to two or more CSI-RS collide, all the CSI reports are multiplexed and sent together. Different approaches can be used for multiplexing:

1. Based on PUCCH Format 3

Though the individual reports are transmitted based on different PUCCH formats, in the event of collision multiple reports are multiplexed into a single report using the higher capacity PUCCH channel format 3, which can support less than or equal to 22 bits.

In one method, when more than three reports collide, two of the reports are multiplexed and the rest of the reports are dropped. The prioritization for selecting the multiplexed reports and the dropped reports could follow one or more dropping rules discussed previously. In another method, the number of reports multiplexed is such that they can be supported by the format size of the PUCCH format 3. For example, three RI reports (—3 bits each) can be accommodated in a single PUCCH Format 3 report.

In one method, whether to multiplex using PUCCH format 3 or drop the reports (except one) may be based on the link quality of the user. In one method, whether to multiplex using PUCCH format 3 or drop the reports (except one) may be configured by higher layers.

2. Conditioned on PUSCH

The network could control the behavior in the event of collision. In one method a PUSCH resource could be scheduled for the user for transmission on the uplink control information (UCI) (or CSI) in that sub-frame. If a uplink (UL) grant for such a PUSCH resource is detected, the user transmits the multiplexed report on the PUSCH (which has larger capacity than PUCCH). If no grant for PUSCH resource is detected, the user simply drops one or more reports, e.g., according to Embodiment 1. More generally, the multiplexing/dropping behavior could be based on the configuration and the size of the PUSCH resource (e.g., two or three reports may be multiplexed based on the PUSCH resource size and/or configuration).

The network may also semi-statically configure PUSCH resources, since it is aware of the collision instances. In such case, if a PUSCH resource is configured in a sub-frame with collision event, multiplexing of reports may be used; otherwise CSI dropping may be used, e.g., according to Embodiment 1.

If the UL grant for such a configured PUSCH resource has non-zero value for CSI request field, then an aperiodic CSI report as configured by CSI request is transmitted and periodic CSI is dropped.

If the UL grant for such a configured PUSCH resource has a zero value for the CSI request field, and in the event of collision of two or more CSI reports, then a periodic CSI report is sent by multiplexing the CSI reports as explained above.

In one method, even if simultaneous transmission of PUCCH and PUSCH is configured, in case of collision of periodic CSI reports, both the CSI and data are multiplexed on PUSCH.

In some cases, other control information on the uplink like acknowledgement/non-acknowledgement (ACK/NACK) feedback may collide with CSI. In this case, the dropping and multiplexing rules may be further modified by such an event.

In one method, if user is configured with simultaneous PUCCH/PUSCH transmission, in the event of collision of periodic PUCCH CSI reports, the CSI is transmitted on a scheduled PUSCH resource and ACK/NACK is transmitted on the PUCCH resource configured for ACK/NACK, e.g., PUCCH format 1a/1b/3. If user is not configured simultaneous PUCCH/PUSCH transmission, in the event of collision of periodic PUCCH CSI reports, the CSI and ACK/NACK are transmitted on a scheduled PUSCH.

3. Semi-Statically Configured PUCCH Format 3

In one method, a network may semi-statically configure a PUCCH format 3 resource, since it is aware of the collision instances. If such configured PUCCH Format 3 resource is available, a user may multiplex the CSI in the configured PUCCH format 3 or otherwise drop CSIs according to e.g., Embodiment 1.

In some cases, other control information on the uplink like ACK/NACK feedback may collide with CSI. In this case, the dropping and multiplexing rules may be further modified by such an event.

In one method, if ACK/NACK (or Scheduling Request (SR)) collides with CSI, one or more of the CSI may be multiplexed with ACK/NACK using PUCCH format 3 configured for ACK/NACK. In another method, if ACK/NACK (or SR) collides with CSI, one or more of the CSI may be multiplexed with ACK/NACK using PUCCH format 3 configured for CSI. This behavior may be dependent upon the higher-layer configured value of simultaneousAckNackAndCQI; in other words, ACK/NACK and CSI are multiplexed if simultaneousAckNackAndCQI==TRUE, while only ACK/NACK is transmitted on the PUCCH format 3 configured for ACK/NACK with dropping CQI if simultaneousAckNackAndCQI=FALSE.

In another method, if user is configured with simultaneous PUCCH/PUSCH transmission, in the event of collision of periodic PUCCH CSI reports in a subframe in which a PUSCH is scheduled, the CSI is transmitted on a scheduled PUSCH resource and ACK/NACK is transmitted on the PUCCH resource configured for ACK/NACK; if user is not configured with simultaneous PUCCH/PUSCH transmission, in the event of collision of periodic PUCCH CSI reports in a subframe in which a PUSCH is scheduled, the CSI and ACK/NACK are transmitted on a scheduled PUSCH resource.

To clarify, "CSI configuration" is used to refer to at least the corresponding CSI-RS resource and the IMR resource. It may also include other parameters like the non-zero power CSI-RS resources that may be used for interference part. A CSI report on the other hand is a feedback report that is sent in an uplink subframe with an associated CSI configuration and a serving cell and belongs to one of the report types and includes feedback elements like PMI/CQI/RI. In this context, it also corresponds to the report that is colliding at a given subframe.

If two CSI reports corresponding to the same serving cell and the same CSI configuration collide, a single CSI report is selected based on the type, using the following method that is defined in 36.213 for collisions for the same serving cell. That is, in case of collision of a CSI report with PUCCH reporting type 3, 5, or 6 of one serving cell with a CSI report with PUCCH reporting type 1, 1a, 2, 2a, 2b, 2c, or 4 of the same serving cell the latter CSI report with PUCCH reporting type (1, 1a, 2, 2a, 2b, 2c, or 4) has lower priority and is dropped. An assumption is made that such a first step is applied and the collision rules described in this disclosure apply to resolving collision of the CSI reports, each of which has a unique (serving cell, CSI configuration pair). In the embodiments below, "CSI configuration" and "CSI report" may be sometimes used interchangeably when convenient, since at a given collision instance, there is a one to one mapping between the two with the above understanding of a first step resolution.

Embodiment 3

Compressing the CSI Reports

In another method, the CSI parameters (e.g., PMI/RI/CQI) corresponding to colliding CSI reports of multiple CSI configurations can be compressed to reduce the overhead. In one method, such compression (as further described below) may only be applied if the report types of the colliding CSI reports are the same.

In one method, two colliding CSI reports are compressed to less than 11 bits. Compression can be done by different approaches. In one method of compression, the corresponding parameters are jointly or differentially encoded with each other. In another method, the one or more parameters are aligned between CSI reports. As an example, the rank and/or PMI may be required to be the same between CSI reports.

In one method, when rank is required to be the same, it can be determined by the UE based on:
 the rank corresponding to the CSI-RS report with highest measured CQI;
 the rank corresponding to the CSI-RS report with lowest (or highest) measured rank; and
 the restricted rank that may be explicitly configured by the network for CSI reporting to be applied in case of collisions of two periodic reports.

In one method, a PMI may be required to be the same if the two CSI configurations of the colliding CSI reports have the same associated CSI-RS resources (with different IMR resource configuration). The PMI may be required to be reported based on:
 the PMI of the CSI-RS report with highest (or lowest) measured CQI;
 the PMI of the CSI-RS report with highest (or lowest) measured rank;
 the CSI-RS configuration index or prioritization that is explicitly configured by the network for CSI reporting to be applied in case of collisions of two periodic reports; and
 the associated IMR resource index or prioritization that is explicitly configured by the network for CSI reporting to be applied in case of collisions of two periodic reports.

In one method, in case of collision of multiple periodic CSI reports, if the feedback mode corresponding to the different CSI reports is the same, compression may be applied. Otherwise, if the feedback mode is different dropping or multiplexing (with no compression) may be applied.

In one method, a different handling rule may be applied based on the CSI configuration corresponding to the CSI reports. In one embodiment, the following rule is employed:
 if the CSI configurations have the same CSI-RS resource, but different IMR resources, then the PMI is aligned and rank is reported individually;
 if the CSI configurations have the same IMR resource, but different CSI-RS resources, then the rank is aligned, but PMI is reported individually; and
 if the CSI configurations has neither the same IMR resource nor the same CSI-RS resource, then both the rank and PMI are individually reported—i.e., no compression.

In one method, interference measurement for a CSI configuration may be based on both an IMR resource and one or more non-zero power CSI-RS resources. In such case, the above rule is rewritten as follows:
 if the CSI configurations have the same CSI-RS resource, but different interference measurement configurations, then the PMI is aligned and rank is reported individually;
 if the CSI configurations have the same interference measurement configuration, but different CSI-RS resources, then the rank is aligned, but PMI is not aligned; and
 if the CSI configurations have neither the same interference measurement configuration nor the same CSI-RS resource, then both the rank and PMI are individually reported—i.e., no compression where an interference measurement configuration is used to refer to at least an IMR resource (and optional non-zero power resource configured for interference measurement).

In one method, in each of the above rules, the third condition can be modified to:
 if the CSI configurations have neither the same interference measurement configuration nor the same CSI-RS resource, then only one (or a subset if there are more than two colliding reports) of the CSI reports is fed back and others are dropped.

Embodiment 4

Collision of Reports with Carrier Aggregation+CoMP

The case is now considered of collision where the colliding CSI reports correspond to more than one cell (carrier) and at least one cell has multiple CSI reports, each corresponding to a CSI configuration, which could happen if a UE may be configured with multiple periodic feedbacks corresponding to different carriers as well as different CSI-RS configurations. An example with collision of three reports is shown below:

TABLE XI

| Periodic CSI Configuration | Cell Type/Index (Carrier Type/Index) | CSI configuration (CSI-RS resource and an IMR resource) |
|---|---|---|
| 1 | Primary cell | CSI configuration 1 |
| 2 | Primary cell | CSI configuration 2 |
| 3 | Secondary cell 1 | CSI configuration 1 |

The embodiments described below are for such collision of CSI reports. Note that in the embodiments below, "CSI configuration" and "CSI report" are used interchangeably, since at a given collision instance, there is a one to one mapping between the two.

In a first approach, rules can be defined for cases of collision considering CA only or CoMP only as summarized below.
 i) Carrier aggregation (CA) without CoMP—These rules are defined to resolve collision when there are multiple reports each corresponding to different cell. Only a single CSI configuration is configured per cell.
 ii) CoMP without carrier aggregation—These rules are defined to resolve collision when there are multiple reports each corresponding to a different CSI configuration, all on single serving cell.

The collision resolution rules considering CA+CoMP type collisions can clearly reuse these again as a subrule. A set of rules already exist in Release-10 LTE for i), since CoMP was not introduced. When we refer to rules for resolving CA without CoMP, we refer to these or extensions that may be defined in a future release for such collision case; some example extensions are considered in embodiments 1, 2 and 3. Similarly, when we refer to rules for resolving CoMP without CA, we refer to new rules that are defined in a future release that apply in such a case; some example extension are considered in embodiments 1, 2 and 3.

1. Prioritizing CA

In one embodiment, the CSI report of a single CSI configuration is selected from each cell in a first step. The selection of such single configuration is by using one of the dropping rules for multiple CSI configurations on a single cell described before (CoMP without CA). In a second step, the selected CSI reports from each of the cells are dropped or multiplexed following the rules as used for carrier aggregation without CoMP.

In another embodiment, the CSI reports of the CSI configurations from each cell are compressed to fit in a PUCCH Format 2a or 2b. In a second step, the selected CSI reports from each of the cells are dropped or multiplexed following the rules as used for carrier aggregation without CoMP.

In another embodiment, the CSI reports of the CSI configurations from each cell are compressed to fit in a PUCCH Format 2a or 2b (or the number of CSI bits in the CSI reports from each cell is less than or equal to 11). In a second step, the selected CSI reports from each of the cells are dropped or multiplexed so that the final resulting CSI for the CA+CoMP has less than or equal to 22 bits to fit in a PUCCH format 3.

In another embodiment, the CSI reports of the CSI configurations from each cell are multiplexed to fit in a PUCCH format 3. In a second step, the selected CSI reports from each of the cells dropped or multiplexed following the rules as used for carrier aggregation without CoMP.

In another embodiment, the CSI reports of the CSI configurations from each cell are multiplexed to fit in a PUSCH configuration. In a second step, the selected CSI reports from each of the cells dropped or multiplexed following similar rule as used for carrier aggregation without CoMP.

2. Prioritizing CoMP

In one embodiment, a single cell is selected by prioritizing based on the cell index in a first step. In a second step, the collision handling of the multiple CSI reports of a single cell is done by applying similar rules to that of carrier aggregation without CoMP.

3. UE behavior

In one embodiment, the UE behavior maybe left unspecified if such a collision happens—that is, it is left to UE implementation.

In another embodiment, in case of such collision a default UE behavior is specified. Such default behavior could be to feedback the CSI report corresponding to the lowest cell index and the lowest CSI configuration index (or lowest CSI-RS or IMR index). Another default behavior is to not report anything.

4. PUSCH

In one embodiment, in case of such collision, a PUSCH report is sent by the UE including all the reports. This behavior could be configurable by the network.

5. Different Formats

In another approach, let us consider that a UE is configured with carrier aggregation (i.e., multiple cells/carriers). In one embodiment, this rule is defined for collision handling:
 In case of collision of multiple CSI reports, if the colliding reports are all from a single cell, then PUCCH format 3 is used to multiplex multiple CSI reports of the single cells. If the payload is beyond the capacity of Format 3 or if the number of reports is greater than certain number (e.g., 2), some reports may be dropped following the previously described dropping rules.
 In case of collision of multiple CSI reports corresponding to multiple cells, with more than two CSI-RS reports corresponding to multiple CSI configurations for at least one cell (CA+CoMP case), then in a first step the one or more reports corresponding to each cell are either compressed or multiplexed or down-selected to a PUCCH format 2a/2b report size. In a second step, the dropping/multiplexing rules corresponding to carrier aggregation without CoMP are then used.

In the event that a UE is configured with carrier aggregation (i.e., multiple cells/carriers), in another embodiment, this rule is defined for collision handling:
 In case of collision of multiple CSI reports, if the colliding reports are all from a single cell, then PUSCH is used to multiplex multiple CSI reports of the primary cell.
 The other reports could be completely dropped or down-selected/multiplexed to be sent on PUCCH 2a/2b or 3

6. Primary Cell CSI Reports

In one embodiment, the collision handling could be different depending on the primary cell CSI reports in the collision.

In one embodiment, if the primary cell has a single CSI report, then carrier aggregation is prioritized over CoMP and one of the corresponding embodiments for prioritizing CA over CoMP described earlier are used. If primary cell has more than one CSI report, then the CoMP is prioritized over carrier aggregation and one of the corresponding embodiments for prioritizing CoMP over CA described earlier is used. If there is no primary cell report, then a default rule may be used, e.g., only a single CSI report is selected by dropping all the other reports or not to report anything.

7. Based on Report Type

In another embodiment, the three or more CSI reports are first down selected to one or more CSI reports based on the type of the report. In a second step, if only a single report remains, then that report is sent;
if two reports remain, then either the CoMP without CA or the CA without CoMP collision handling rules are applied; and
if more than two reports remain, then either the behavior is left unspecified or a default behavior is specified or one or more of the collision handling rules described above may be used or a type (of the remaining CSI reports) dependent behavior is specified. Default behaviors could be to feedback nothing or feedback a single report dropping others or feedback the CSI report of the lowest cell index and the lowest CSI configuration index dropping others.

Embodiment 5

In one embodiment, a first RRC configuration is used to define the collision resolution behavior that applies in the case of CA without CoMP, i.e., when CSI reports corresponding to multiple cells collide, but with only a single CSI report per cell. A second RRC configuration is used to define the collision resolution behavior in case of CoMP without CA collision, i.e., when CSI reports corresponding to multiple CSI configurations of a single cell. A third RRC configuration is used for the collision resolution behavior of CoMP and CA collision. An RRC configuration is one or more configurable parameters that could represent, for example, whether dropping or multiplexing or compression schemes are used. As another example, the configurable parameters could include thresholds that may be used for switching between different behaviors. Such thresholds could be, for example, i) the number of colliding reports, ii) the number of bits in each of the colliding reports, iii) the total number of bits in the colliding reports. As another example, the configurable parameters could refer to the whether certain uplink formats are used, which could include: i) PUCCH Format 2/2a/2b, ii) PUCCH Format 3, and/or iii) PUSCH.

In the above embodiment, in one method, a UE derives the collision rules for the case of CoMP and CA collision, i.e., collision of multiple CSI reports corresponding to multiple cells, with more than two CSI reports corresponding to multiple CSI configurations for at least one cell, based on the first and the second RRC configurations.

In another method, a UE derives the collision rules for the case of CoMP and CA collision based on the first RRC configuration only.

In one example, the first RRC configuration parameters regarding the case of CA without CoMP indicates either the dropping scheme as in Rel-10 specification or a multiplexing/compression scheme (some examples can be found in embodiments 1, 2 and 3) should apply. For resolving the collision of CoMP and CA, the UE behavior changes depending upon whether the first RRC configuration parameters indicate the dropping or the multiplexing/compression scheme.

When dropping is configured, the UE would transmit only one cell's CSI report after compressing/multiplexing/dropping the CoMP CSI reports in each of the configured cells according to the pre-defined method (some examples can be found in embodiments 1, 2 and 3), where the only one cell's CSI report is conveyed in PUCCH format 2/2a/2b, for example. Here, the UE behavior of transmitting only one cell's CSI report out of the multiple cells' CSI reports can be defined according to a method in embodiment 1 or the Rel-10 UE behavior when multiple CSI reports for multiple cells collide in a subframe, for example.

When the multiplexing/compression is configured, the UE would compress/multiplex multiple cells' CSI reports to carry in either PUCCH format 3 or PUSCH according to a pre-defined method (some examples can be found in embodiments 2 and 3) after compressing/multiplexing/dropping the CoMP CSI reports in each of the configured cells according to a pre-defined method (some examples can be found in embodiments 1, 2 and 3).

In another method, a UE derives the collision rules for the case of CoMP and CA collision based on the third RRC configuration only.

In another method, a UE may use one or more of the first, the second and the third RRC configurations in deriving collision rules for CoMP and CA collision.

Option 2: Joint Configuration of Multiple Periodic Reports

Embodiment 6

Under one approach, in the presence of some reports that carry inter-CSI-RS resource feedback, set up of a single PUCCH feedback mode is preferred. Some examples of such inter-CSI-RS resource feedback could be:

1. Single RI Feedback:

The network may require a single RI report for two or more CSI-RS resources for which feedback is requested. Such alignment of rank enables the network to perform joint transmission based on per-CSI-RS resource feedback.

2. Aggregate CQI Feedback:

Aggregate CQI is the CQI assuming joint transmission from one or more transmission points.

3. Aggregate PMI:

Aggregate PMI is the PMI assuming joint transmission from one or more transmission points.

4. Inter-TP Phase Feedback

The phase feedback corresponding to phase alignment between two CSI-RS resources for joint transmission.

In one method, new feedback modes could be defined for two or more CSI-RS resource joint feedback configuration:

TABLE XII

| | | (PMI Feedback Type, CoMP Feedback Type) | | | |
|---|---|---|---|---|---|
| | | No PMI, One CSI-RS Resource | Single PMI, One CSI-RS Resource | No PMI, Two CSI-RS Resource | Single PMI, Two CSI-RS resource |
| PUCCH CQI Feedback Type | Wideband (wideband CQI) | Mode 1-0 | Mode 1-1 | Mode 1-4 | Mode 1-5 |
| | UE Selected (subband CQI) | Mode 2-0 | Mode 2-1 | Mode 2-4 | Mode 2-5 |

In one method illustrated in FIG. 3, the reports corresponding to multiple CSI-RS resources are multiplexed in time as shown. In the example depicted, a joint rank indicator (RI) is reported in a first reporting instance within a subframe, then a wideband (WB) precoding matrix indicator (PMI)/channel quality information (CQI) for a first CSI-RS is reported in a next reporting instance within a subframe, and then a WB PMI/differential CQI (with respect to the previously reported CQI) for a second CSI-RS is reporting in the third reporting instance of the subframe, after which the reports are cyclically repeated. In one method, the independent reports are simply multiplexed—i.e., an independent report type (for instance, a wideband CQI associated with each CSI-RS resource) is configured with a single set of periodicity/offset parameters across all CSI-RS resources. New report types like aggregate CQI are transmitted with the correspondingly defined timing parameters ($Nd_{aggregateCQI}$, $Noffse_{aggregateCQI}$).

In another method illustrated in FIG. 4, reports for multiple CSI-RS resources may be configured together for certain report types like wideband/subband CQI, wideband/subband PMI. Further, the CQIs could be jointly encoded (in the aggregate) with differential encoding. In such a case, PUCCH Format 3 is used for transmission of such new report type. The inter-CSI-RS resources CQIs like aggregate CQI are configured separately with their own timing parameters ($Nd_{aggregateCQI}$, $Noffset_{aggregateCQI}$).

In one method, one or more of the report types includes aggregate CQI and/or inter-TP phase can be made configurable within a single mode. Such configuration may be indicated by RRC configuration as a submode parameter for that mode.

Option 3: Single Periodic PUCCH Configured with UE Autonomous TP Switching

Embodiment 7

In this case, the UE transmit the CSI corresponding to a single CSI-RS resource only. The choice of which CSI to transmit may be performed by the UE based on performance (for instance, CQI or reference signal receive power (RSRP)). The UE measures the CSI of individual CSI-RS resources and switches between the reporting types based on the best CQI or RSRP. A CSI-RS Resource indicator (CRI) is sent separately to indicate switching, as illustrated in FIG. 5A.

In one method, RI and CRI are jointly encoded as shown in FIG. 5B.

Embodiment 8

In Release-10, the following UE-selected subband modes are supported for periodic CSI reporting. Further details are available in 36.213, but the high level components of the feedback are summarized in the table:

TABLE XIII

| | |
|---|---|
| Mode 2-0 | Wideband CQI/RI |
| | Selected Subband Index in each BP |
| Mode 2-1 | Wideband CQI/RI/PMI/PTI |
| | Selected Subband Index in each BP |
| | Subband CQI/PMI |

Some further aspects of the UE selected subband feedback modes are discussed below. UE selected feedback modes are designed to support frequency selectivity, while keeping the feedback overhead sufficiently low. If the selected subbands for multiple CSI do not overlap, this constrains the flexibility of transmission schemes at the UE.

For example, four different CoMP transmission hypotheses are shown in FIG. 6 which could allow DPS/DB or JT transmission for the CoMP between two cells. These could be configured as multiple CSI configurations for feedback. In this example, considering the frequency selectivity of interference as well, the selected subbands can be different for each hypothesis/CSI-configuration. So in this case, the CoMP scheduler has access to different UE reports on different bands for different hypothesis, complicating scheduler optimizations and CQI prediction.

In one embodiment, a new PUCCH feedback mode 2-x is defined, which will enable simultaneous transmission of individual report types corresponding to multiple CSI at the same time. For this new mode, the UE is required to select the same sub-band for the reported CoMP hypotheses. That is, the UE reports a single subband index corresponding to two or more CSI configurations. As part of higher layer configuration of such a new mode, the network configures two or more CSI configurations (also can be referred to as CSI processes), where each CSI configuration correspond to a different (CSI-RS, Interference Measurement Resources/IMR) pair.

In another embodiment, the behavior described above can be implicitly obtained by configuring same set of timing parameters for each mode. In one method, if one or more parameters of one or more reports of two periodic CSI processes overlap (parameter criterion), then the UE is required to select the same subband(s) for these reported CoMP hypothesis. The one or more parameters could be the timing parameters of the CSI process like the periodicity and offset of the different report types, or the parameters could be one or more of the CSI-RS index, IMR index, and other interference measurement parameters. More generally the parameter criterion could be specified by some relationship between the parameters of different CSI processes. As an example, one criterion could be if they have same CSI-RS index, but different IMR index and so on.

Further, a separate higher layer parameter may indicate whether alignment of subband must be performed when the parameter criterion is met. One state of the parameter indicates that the UE reports a common single subband index for two or more CSI processes that satisfy the parameter criterion and another state of the parameter indicates that different subband index must be reported for each of the two or more CSI processes.

In another embodiment, a higher layer configuration (RRC configuration) can indicate a linking between the multiple periodic CSI processes. For example, a CSI process list can be configured as reflected by the following pseudo-code, which captures multiple parameters corresponding to each individual CSI process (CoMP hypothesis):

```
CSI process config list {
    CSI process config x{
        CSI process id
        XCSIRS (virtual cell id for CSI-RS)
        Non-zero power CSI-RS resource config
        IMR config
        Timing config
        ...
    }
}
```

A higher layer configuration could indicate linking of two or more processes that are configured to report sub-band reports. If the UE receives such signaling, it is required to select the same subband(s) in each bandwidth part.

However, in some situations the timing parameters can be vastly different. So further definition of selecting the same sub-band must be defined.

Further definition of UE behavior must be defined on how the common subband index must be selected. In release 10, a subband index is selected to maximize the CQI when a single CSI process is configured. In one embodiment, the UE should select the common subband index based on one or more CQIs of the two or more CSI processes that are configured for common subband reporting. In one method, the common subband index is based on the sum total CQI of two or more CSI processes. In one method, the common subband index is based on the CSI process with the maximum CQI (e.g, maximum wideband CQI).

In one method, the common subband index is based on the reference CSI process. The reference CSI process could be determined based one or more parameters associated with the two or more CSI processes. In one method, the common subband index is based on the CSI process with the lowest index. In one method, the common subband index is based on CSI process with the lower (or higher) periodicity. In one method, the reference CSI process is configured by the network with higher layer signaling. As an example, a network configures CSI process 1 as the reference process. In this case, the subband selection must be based on CSI process 1 and the subband selection on other subbands and the rest of feedback parameters of each CSI process must be aligned with this selection.

Indication of Reference CQI Resource and Interference Measurement

The current LTE standards specification defines a CSI reference resource, which is the resource to which UE's feedback should correspond. The UE implementation is not precluded from averaging over "similar" subframes. Interference measurement in Release-10 relies on CRS that are available in every subframe. Hence no reference to interference measurement is made in the CSI reference resource definition.

From TS 36.213, the CSI reference resource is defined as follows:
  In the frequency domain, the CSI reference resource is defined by the group of downlink physical resource blocks corresponding to the band to which the derived CQI value relates.
  In the time domain, the CSI reference resource is defined by a single downlink subframe n-$n_{CQI\_ref}$,
    where for periodic CSI reporting, $n_{CQI\_ref}$ is the smallest value greater than or equal to 4, such that it corresponds to a valid downlink subframe;
    where for aperiodic CSI reporting, $n_{CQI\_ref}$ is such that the reference resource is in the same valid downlink subframe as the corresponding CSI request in an uplink DCI format; and
    where for aperiodic CSI reporting, $n_{CQI\_ref}$ is equal to 4 and downlink subframe n-$n_{CQI\_ref}$ corresponds to a valid downlink subframe, where downlink subframe n-$n_{CQI\_ref}$ is received after the subframe with the corresponding CSI request in a Random Access Response Grant.
  A downlink subframe in a serving cell shall be considered to be valid if:
    it is configured as a downlink subframe for that UE, and
    except for transmission mode 9, it is not an MBSFN subframe, and
    it does not contain a Downlink Pilot Time Slot (DwPTS) field in case the length of DwPTS is 7680·$T_s$ and less, and
    it does not fall within a configured measurement gap for that UE, and
    for periodic CSI reporting, it is an element of the CSI subframe set linked to the periodic CSI report when that UE is configured with CSI subframe sets.
  If there is no valid downlink subframe for the CSI reference resource in a serving cell, CSI reporting is omitted for the serving cell in uplink subframe n.
  In the layer domain, the CSI reference resource is defined by any RI and PMI on which the CQI is conditioned.

With Explicit Indication of IMR Resource for Periodic CSI Configuration

The IMR resource index (or indices) and CSI-RS resource index (or indices) are associated with each PUCCH feedback mode configuration and are explicitly indicated with RRC configuration of one or more periodic CSI configuration:

TABLE XIV

| Periodic CSI Configuration | CSI-RS Resource Index | IMR Resource Index |
|---|---|---|
| Configuration | X | Y |

The CSI reference resource definition can be modified to incorporate IMR resource for periodic CSI reporting.

In one method, the basic principle is not changed from old releases (i.e., Rel-8, 9, 10) of LTE specification and the reference subframe is defined the same as before without reference to the interference measurement. Interference should be based on measurements on the subframes with configured IMR resource(s). It is assumed that UE performs interpolation/extrapolation of interference if the reference subframe does not include corresponding IMR resource(s).

However, with enhanced Inter-Cell Interference Coordination (eICIC), two subframe subsets are used. The interference measurement should be on the corresponding subframe subset as configured for that CSI request (i.e., it is an element of the CSI subframe set linked to the periodic CSI report when that UE is configured with CSI subframe sets).

Figure 7:
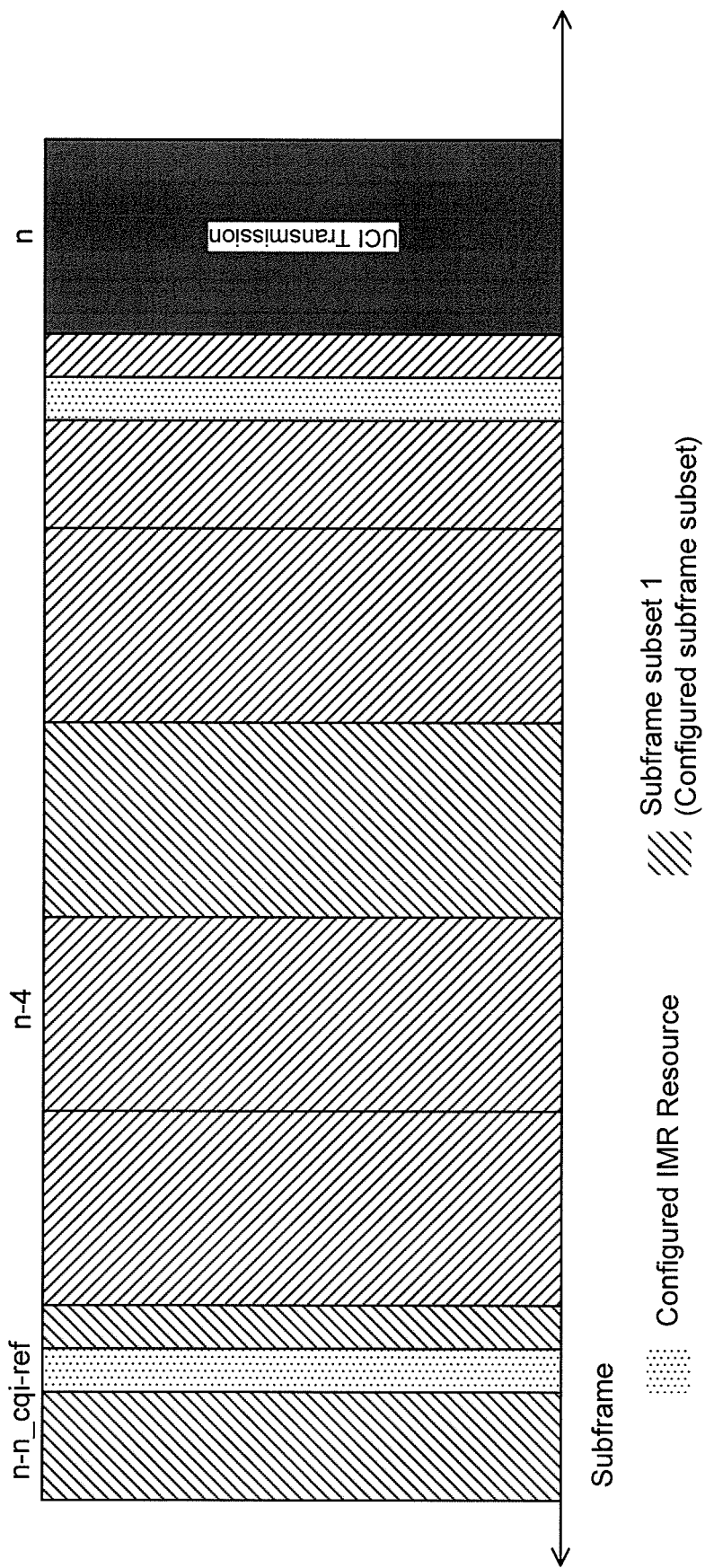
FIG. 7 illustrates an IMR resource configuration in which the reference subframe is based on the intersection of the IMR resource and the CSI subframe subset for channel information feedback for coordinated multi-point transmission implemented according to one or more embodiments of the present disclosure.

In one method, with IMR resource configuration, the reference subframe is based on the intersection of the IMR resource and the CSI subframe subset. This can be achieved by modifying the definition of a valid downlink subframe further as illustrated in FIG. 7.

In the time domain, the CSI reference resource is defined by a single downlink subframe n-$n_{CQI\_ref}$,
  where for periodic CSI reporting, $n_{CQI\_ref}$ is the smallest value greater than or equal to 4, such that it corresponds to a valid downlink subframe.
A downlink subframe in a serving cell shall be considered to be valid if:
  it is configured as a downlink subframe for that UE, and
  except for transmission mode 9, it is not an MBSFN subframe, and
  it does not contain a DwPTS field in case the length of DwPTS is 7680·$T_s$ and less, and
  it does not fall within a configured measurement gap for that UE, and
  for periodic CSI reporting, it is an element of the CSI subframe set linked to the periodic CSI report when that UE is configured with CSI subframe sets and (new criteria) an element of subframe set of the interference measurement resource linked to the periodic CSI report if the UE is configured with interference measurement resources.

Aperiodic Feedback Modes

With PUSCH based aperiodic feedback modes, higher uplink control information (UCI) overhead may be supported than PUCCH based periodic feedback modes, whose capacity is limited by that supported by Format 3 (22 bits). This is suited for transmission of UCI corresponding to multiple CSI-RS resources in CoMP.

A summary of the aperiodic feedback modes are captured from 36.213 below:

A UE is semi-statically configured by higher layers to feed back CQI and PMI and corresponding RI on the same PUSCH using one of the following CSI reporting modes given in Table 7.2.1-1 and described below.

TABLE XV corresponding to Table 7.2.1-1: CQI and PMI Feedback Types for PUSCH CSI reporting Modes [from 36.213]

|  |  | PMI Feedback Type | | |
| --- | --- | --- | --- | --- |
|  |  | No PMI | Single PMI | Multiple PMI |
| PUSCH CQI Feedback Type | Wideband (wideband CQI) |  |  | Mode 1-2 |
|  | UE Selected (subband CQI) |  | Mode 2-0 | Mode 2-2 |
|  | Higher Layer-configured (subband CQI) | Mode 3-0 | Mode 3-1 |  |

If no inter-CSI-RS resource feedback is supported, then no new modes need to be defined for aperiodic CSI.

In the current specification (in Section 7.2.1 of 36.213, summarized below), DCI Format 0 (or 4) supports a "CSI request field," which indicates whether aperiodic CSI is turned on and on which cells (carriers) CSI is to be reported as shown in the table below.

A UE shall perform aperiodic CSI reporting using the PUSCH in subframe n+k on serving cell c, upon decoding in subframe n either:

an uplink DCI format, or
a Random Access Response Grant, for serving cell c if the respective CSI request field is set to trigger a report and is not reserved. If the CSI request field is 1 bit [4], a report is triggered for serving cell c if the CSI request field is set to "1." If the CSI request field size is 2 bits [4], a report is triggered according to the value in Table 7.2.1-1A corresponding to aperiodic CSI reporting.

A UE is not expected to receive more than one aperiodic CSI report request for a given subframe.

TABLE XVI corresponding to Table 7.2.1-1A: CSI Request field for PDCCH with uplink DCI format in UE specific search space [from 36.213]

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a 1$^{st}$ set of serving cells configured by higher layers |
| '11' | Aperiodic CSI report is triggered for a 2$^{nd}$ set of serving cells configured by higher layers |

The above will be referred to as the CA CSI request field.

Similarly, a CSI request may be needed to indicate the set of CSI-RS resources for CoMP. In one method, an independent CSI request field is defined for CoMP and referred to as CoMP CSI request field:

TABLE XVII

| Value of CSI request field | Description |
| --- | --- |
| '00' | No aperiodic CSI report is triggered |
| '01' | Aperiodic CSI report is triggered for CSI-RS resource 1 (or any configured fixed CSI-RS resource or CSI configuration) on serving cell c |
| '10' | Aperiodic CSI report is triggered for a 1$^{st}$ set of CSI-RS resources (or CSI configurations) configured by higher layers on serving cell c |
| '11' | Aperiodic CSI report is triggered for a 2$^{nd}$ set of CSI-RS resources (or CSI configurations) configured by higher layers on serving cell c |

In one method, the UE derives which of the above CSI request fields (CA or CoMP) to interpret based on whether it is configured for CA (with multiple cells) or with CoMP (multiple CSI resources). In one method, the determination may be based on the UE capability or the network configuration.

A UE may be configured with simultaneous CA+CoMP (multiple cells and multiple CSI-RS resources on at least one cell). In one method, if independent CSI request fields are defined for CoMP and CA as in the above tables, an additional single bit is used to signal whether the CSI request field applies to CA or CoMP. In one method, this may be indicated with a CSI type field as follows:

TABLE XVIII

| Value of CSI type field | Description |
| --- | --- |
| '0' | The CSI request field triggers the CSI report on the set of CSI resources corresponding to serving cell c, using CSI request field table for CoMP |
| '1' | The CSI request field triggers CSI report on the set of cells (corresponding to CSI resource index 1 (or a fixed CSI resource index) for each cell) using the CSI request field table for CA |

In one method, the additional CSI type field in the DCI format is only valid if the UE is configured for CA and CoMP (with multiple cells and multiple CSI resources on at least one cell).

In one method, the type could be indicated implicitly.

In another method, a jointly encoded CSI request field may be used. An example with 2-bit encoding is shown below. In this case, CoMP is only supported on the serving cell c.

TABLE XIX

| Value of CSI request field | Description |
| --- | --- |
| '00' | No aperiodic CSI report is triggered |
| '01' | Aperiodic CSI report is triggered for serving cell c and 1$^{st}$ set of CSI-RS resources (or CSI configurations) configured by higher layers on serving cell c |
| '10' | Aperiodic CSI report is triggered for serving cell c and 2$^{nd}$ set of CSI-RS resources (or CSI configurations) configured by higher layers on serving cell c |
| '11' | Aperiodic CSI report is triggered for a 1$^{st}$ set of serving cells configured by higher layers (based on a single CSI-RS resource per each cell) |

In one embodiment, the single CSI-RS resource per cell triggered when CSI request field is "11" is either pre-defined (e.g, CSI configuration index 1) or configured by higher layers per cell.

Overall, the choice of carrier aggregation and CoMP scenarios are heavily dependent on available bands, CoMP capabilities on different bands and other deployment considerations. So maximum network flexibility may be desirable. In that case, it may be better to allow the network to decide what configurations it would like to support for dynamic switching.

For this purpose, a CoMP+CA configuration is defined as referring to the pair (Serving cell/Carrier Index, CSI Configuration Index). Note that the LTE specification refers to the cell index with the parameter ServCellIndex.

With this definition, we could design a new CSI request field as follows:

TABLE XX

| Value of CSI request field | Description |
|---|---|
| '00' | No aperiodic CSI report is triggered |
| '01' | Aperiodic CSI report is triggered for a serving cell c and CSI configuration 1 |
| '10' | Aperiodic CSI report is triggered for a $1^{nd}$ set of serving cell and CSI configuration pairs configured by higher layers |
| '11' | Aperiodic CSI report is triggered for a $2^{rd}$ set of serving cell and CSI configuration pairs configured by higher layers |

TABLE XXI

| Value of CSI request field | Description |
|---|---|
| '00' | No aperiodic CSI report is triggered |
| '01' | Aperiodic CSI report is triggered for a $1^{st}$ set of serving cell and CSI configuration pairs configured by higher layers |
| '10' | Aperiodic CSI report is triggered for a $2^{nd}$ set of serving cell and CSI configuration pairs configured by higher layers |
| '11' | Aperiodic CSI report is triggered for a $3^{rd}$ set of serving cell and CSI configuration pairs configured by higher layers |

As an example, if a UE is configured with two serving cells and two CSI configurations, a first set of serving cell and CSI configuration pairs could be {(serving cell 1, CSI configuration 1), (serving cell 2, CSI configuration 1)}, a second set of serving cell and CSI configuration pairs could be {(serving cell 1, CSI configuration 1), (serving cell 1, CSI configuration 2)}, a third set of serving cell and CSI configuration pairs could be {(serving cell 1, CSI configuration 1), (serving cell 1, CSI configuration 2), (serving cell 2, CSI configuration 1)}. This would allow the network to semi-statically configure multiple types of feedback reports and dynamically seek feedback to perform carrier aggregation or CoMP or both.

In another embodiment, the CSI request field is extended to more than three bits using more than three different sets of serving cell and CSI configuration pairs.

The same set of feedback modes as in Table 7.2.1-1A [36.213] can be reused and if more than one CSI-RS resources are configured, the UE aggregates the per-CSI-RS feedback corresponding to the modes configured on each CSI-RS resource. For example, if mode 1-2 is configured on CSI-RS resource 1 and mode 2-2 on CSI-RS resource 2, the UE aggregates corresponding CSI.

In another method, some inter-CSI-RS feedback may be supported. Examples of inter-CSI-RS feedback include 1) Aligned RI feedback 2) Aggregate CQI Feedback, 3) Aggregate PMI 4) Inter-TP phase feedback.

In one method, the definition of new aperiodic modes is captured below with two CSI-RS resources when one or more inter-CSI-RS resource feedback is supported. One or more of the new modes shown below may be defined for CoMP.

TABLE XXII

| | | (PMI Feedback Type, CoMP Feedback Type) | | | | | |
|---|---|---|---|---|---|---|---|
| | | No PMI, Single CSI-RS Resource | Single PMI, Single CSI-RS Resource | Multiple PMI, Single CSI-RS Resource | No PMI, Two CSI-RS Resource | Single PMI, Two CSI-RS Resource | Multiple PMI, Two CSI-RS Resource |
| PUSCH CQI Feedback Type | Wideband (wideband CQI) | | | Mode 1-2 | | | Mode 1-5 |
| | UE Selected (subband CQI) | Mode 2-0 | | Mode 2-2 | Mode 2-3 | | Mode 2-5 |
| | Higher Layer-configured (subband CQI) | Mode 3-0 | Mode 3-1 | | Mode 3-3 | Mode 3-4 | |

The individual mode definitions and methods to support inter-CSI-RS resource feedback are further summarized below. Note that CSI configuration is defined before and may be used interchangeably with CSI-RS resource (if they share same interference measurement resource configuration).

Mode 2-3 (UE-Selected Subband Feedback for Two CSI Configurations)

The UE shall select a first set of M preferred subbands of size k (where k and M are given in Table 7.2.1-5, 36.213 for each system bandwidth range) within the set of subbands S for the first CSI configuration. The UE shall select a second set of M preferred subbands of size k within the set of subbands S for the second CSI configuration.

The UE shall also report one CQI value reflecting transmission only over the first M selected subbands determined in the previous step for the first CSI configuration and another CQI value reflecting transmission only over the second M selected subbands determined in the previous step for the second CSI configuration. Each CQI represents channel quality for the first codeword of the corresponding CSI configuration, even when RI>1.

Additionally, the UE shall also report one wideband CQI value which is calculated assuming transmission on set S subbands for each CSI configuration. The wideband CQI represents channel quality for the first codeword of the corresponding CSI configuration, even when RI>1.

[Same Rank] In one method, a single RI is reported for both CSI configurations.

For transmission mode 3 the reported CQI values are calculated conditioned on the reported RI. For other transmission modes they are reported conditioned on rank 1.

[Wideband Aggregate CQI] In one method, the UE shall also report one wideband aggregate CQI value which is calculated assuming joint transmission on set S subbands from the two CSI resources. In one method, the aggregate CQI is differentially encoded with the per-CSI-RS wideband CQI

[Wideband inter-CSI-RS phase] In one method, the UE shall report a wideband inter-CSI-RS resource phase feedback corresponding to the two CSI-RS resources of the two CSI configurations.

Mode 3-3 Description (Higher Layer Configured Subband Feedback for Two CSI Configurations):

A UE shall report a wideband CQI value which is calculated assuming transmission on set S subbands per CSI configuration.

The UE shall also report one subband CQI value for each set S subband and each CSI configuration. The subband CQI value is calculated assuming transmission only in the subband.

Both the wideband and subband CQI represent channel quality for the first codeword, even when RI>1.

[Same Rank] In one method, a single RI is reported for both CSI configurations.

For transmission mode 3 the reported CQI values are calculated conditioned on the reported RI. For other transmission modes they are reported conditioned on rank 1.

[Wideband aggregate CQI] In one method, the UE shall also report one wideband aggregate CQI value which is calculated assuming joint transmission on set S subbands from the two CSI resources. In one method, the aggregate CQI is differentially encoded with the per-CSI-RS wideband CQI.

[Subband aggregate CQI] In one method, the UE shall also report one subband aggregate CQI value for each set S subband, which is calculated assuming joint transmission from the two CSI-RS resources. In one method, the subband aggregate CQI is differentially encoded with the wideband aggregate CQI.

Subband differential aggregate CQI offset level=subband aggregate CQI index−wideband aggregate CQI index.

TABLE XXIII

Mapping subband differential aggregate CQI value to offset level

| Subband differential CQI value | Offset level |
|---|---|
| 0 | 0 |
| 1 | 1 |
| 2 | ≥2 |
| 3 | ≤−1 |

Mode 3-4 Description (Higher Layer Configured Subband PMI/CQI Feedback for Two CSI Configurations):

A single precoding matrix is selected for each CSI configuration from the codebook subset of the corresponding CSI configuration assuming transmission on set S subbands.

A UE shall report one a subband CQI value per codeword for each set S subband and for each CSI configuration which are calculated assuming the use of the single precoding matrix corresponding to the CSI configuration in all subbands and assuming transmission in the corresponding subband.

A UE shall report a wideband CQI value per codeword per CSI configuration which is calculated assuming the use of the single precoding matrix corresponding to the CSI configuration in all subbands and transmission on set S subbands The UE shall report the selected single precoding matrix indicator per CSI configuration except for transmission mode 9 with 8 CSI-RS ports configured in which case a first and second precoding matrix indicator are reported corresponding to the selected single precoding matrix per CSI configuration.

[Same Rank] In one method, a single RI is reported for both CSI configurations.

For transmission modes 4, 8 and 9, the reported PMI and CQI values are calculated conditioned on the reported RI. For other transmission modes they are reported conditioned on rank 1.

[Wideband aggregate CQI] In one method, a UE shall report a wideband aggregate CQI value per codeword which is calculated assuming joint transmission using the single precoding matrix corresponding to each CSI configuration in all subbands and transmission on set S subbands.

[Subband aggregate CQI] In one method, a UE shall report a subband aggregate CQI value per codeword for each set S subband which are calculated assuming joint transmission using of the single precoding matrix corresponding to each CSI configuration in the corresponding subband.

[Wideband Inter CSI-RS resource phase] In one method, the UE shall report a wideband inter-CSI-RS resource phase feedback corresponding to the two CSI-RS resources corresponding to the CSI configurations assuming joint transmission on set S subbands.

[Wideband aggregate CQI with phase feedback] In one method, a UE shall report a wideband aggregate CQI value per codeword which is calculated assuming joint transmission using the single precoding matrix corresponding to each CSI configuration in all subbands, using the single wideband inter-CSI-RS resource phase feedback, and transmission on set S subbands.

[Subband aggregate CQI with phase feedback] In one method, a UE shall report a subband aggregate CQI value per codeword for each set S subband which are calculated assuming joint transmission using of the single precoding matrix corresponding to each CSI configuration, using the single wideband inter-CSI-RS resource phase feedback in the corresponding subband.

In one method, the subband aggregate CQI is differentially encoded with the wideband aggregate CQI.

Subband differential aggregate CQI offset level=subband aggregate CQI index−wideband aggregate CQI index

TABLE XXIV

Mapping subband differential aggregate CQI value to offset level

| Subband differential CQI value | Offset level |
|---|---|
| 0 | 0 |
| 1 | 1 |
| 2 | ≥2 |
| 3 | ≤−1 |

Mode 1-5 Description (Wideband Feedback for Two CSI Resources):

For each subband a preferred precoding matrix for each CSI configuration is selected from the codebook subset of the corresponding CSI configuration assuming transmission only in the subband.

For each CSI configuration, a UE shall report one wideband CQI value per codeword which is calculated assuming the use of the corresponding selected precoding matrix in each subband and transmission on set S subbands.

For each CSI configuration, the UE shall report the selected precoding matrix indicator for each set S subband except for transmission mode 9 with 8 CSI-RS ports configured in which case a first precoding matrix indicator $i_1$ is reported for the set S subbands and a second precoding matrix indicator $i_2$ is reported for each set S subband.

Subband size is given by Table 7.2.1-3, 36.213.

[Same Rank] In one method, a single RI is reported for both CSI configurations.

For transmission modes 4, 8 and 9, the reported PMI and CQI values are calculated conditioned on the reported RI. For other transmission modes they are reported conditioned on rank 1.

[Subband inter-CSI-RS phase] In one method, an inter-CSI-RS phase is reported per subband for assuming transmission only in the subband.

[Wideband aggregate CQI with subband inter-CSI-RS phase] In one method, a UE shall report one aggregate wideband CQI value per codeword which is calculated assuming joint transmission and the use of the corresponding selected precoding matrix in each subband, inter-CSI-RS phase per subband and transmission on set S subbands.

Mode 2-5 (UE Selected Subband Feedback for Two CSI Configurations, Multiple PMI):

The UE shall perform joint selection of the set of M preferred subbands of size k within the set of subbands S and a preferred single precoding matrix selected from the codebook subset that is preferred to be used for transmission over the M selected subbands. The M preferred subbands and the associated single precoding matrix are obtained for each CSI configuration.

For each CSI configuration, the UE shall report one CQI value per codeword reflecting transmission only over the corresponding selected M preferred subbands and using the same corresponding selected single precoding matrix in each of the M subbands.

Except for transmission mode 9 with 8 CSI-RS ports configured, for each CSI configuration, the UE shall also report the corresponding selected single precoding matrix indicator preferred for the M selected subbands. For each CSI configuration, a UE shall also report the corresponding selected single precoding matrix indicator for all set S subbands.

For transmission mode 9 with 8 CSI-RS ports configured, for each CSI configuration, a UE shall report a corresponding first precoding matrix indicator for all set S subbands. For each CSI configuration, a UE shall also report a corresponding second precoding matrix indicator for all set S subbands and another corresponding second precoding matrix indicator for the M selected subbands.

For each CSI configuration, a single precoding matrix is selected from the codebook subset of the corresponding CSI configuration assuming transmission on set S subbands For each CSI configuration, a UE shall report an associated wideband CQI value per codeword which is calculated assuming the use of the corresponding single precoding matrix in all subbands and transmission on set S subbands In one method, a single RI is reported for both CSI configurations.

For transmission modes 4, 8 and 9, the reported PMI and CQI values are calculated conditioned on the reported RI. For other transmission modes they are reported conditioned on rank 1.

[Wideband aggregate CQI] In one method, a UE shall report a wideband aggregate CQI value per codeword which is calculated assuming joint transmission using the single precoding matrix corresponding to each CSI configuration in all subbands and transmission on set S subbands.

[Wideband inter-CSI-RS resource phase] In one method, the UE shall report a wideband inter-CSI-RS resource phase feedback corresponding to the two CSI-RS resources corresponding to the CSI configurations assuming joint transmission on set S subbands.

[Wideband aggregate CQI with wideband phase] In one method, a UE shall report a wideband aggregate CQI value per codeword which is calculated assuming joint transmission using the single precoding matrix corresponding to each CSI configuration in all subbands, using the wideband inter-CSI-RS resource phase feedback, and transmission on set S subbands.

[Selection of M subbands assuming joint transmission] In one method, the UE shall perform joint selection assuming joint transmission from two CSI configurations of the set of M preferred subbands of size k within the set of subbands S and a preferred single precoding matrix selected from the codebook subset for each CSI configuration that is preferred to be used for transmission over the M selected subbands.

[Per-CSI-RS resource CQI over the selected M subbands] In one method, the UE shall report one CQI value per codeword reflecting joint transmission only over the corresponding selected M preferred subbands for joint transmission and using the same corresponding selected single precoding matrix for each CSI configuration in each of the M subbands from the previous step.

[Inter-CSI-RS phase for selected M subbands] In one method, the UE shall report a single inter-CSI-RS resource phase feedback assuming joint transmission over the selected M preferred subbands for joint transmission.

[Aggregate CQI on selected M subbands] In one method, the UE shall report one aggregate CQI value per codeword reflecting joint transmission only over the corresponding selected M preferred subbands for joint transmission and using the corresponding selected single precoding matrix for each CSI configuration, and the selected single inter-CSI-RS resource phased feedback, in each of the N subbands.

In one method, the selected single RI for both CSI configurations, as defined in the above feedback modes, could be based on the CSI configuration with the largest wideband CQI. In another method the selected single RI is based on CSI configuration with the largest RI. In another method, the RI is based on one of the CSI configuration, which could be pre-defined or configured by higher layers or fixed (e.g., configuration 1).

For aggregate CQI, the assumed IMR resource for interference measurement may be separately configured by higher layers or implicitly defined (e.g., measure all the interference other than the CSI-RS resources corresponding to the two CSI configurations).

If both the CSI configurations correspond to the same CSI-RS resource, but different IMR resources, then some of the inter-CSI-RS resource feedback need not be supported. There is no need to report aggregate CQI or inter-CSI-RS phase feedback or single rank feedback. In one method, if this is the case, then these reports could be dropped and instead replaced by other reports. For example multiple rank feedback is supported or CQI of the individual CSI configurations can be encoded differentially. However, if the CSI configurations share the same CSI resource, it is preferable not to use the newly defined modes.

More generally, in each of the feedback modes defined, reports corresponding to more than two CSI configurations can be supported. Similar definitions for the inter-CSI-RS resource feedback may be used with simple extensions of definitions described here.

The aperiodic CSI reporting modes can be summarized as follows:

TABLE XXV

| | |
|---|---|
| Mode 2-0 | M-Subband Index, M-Subband CQI, Wideband CQI/RI |
| Mode 2-2 | M-Subband Index, M-Subband CQI/PMI, Wideband CQI/PMI/RI |

CSI reporting for multiple CoMP hypotheses (or CSI processes) can be configured in a single aperiodic report using the CSI-request field in DCI. With UE selected subband feedback, the reported M-subband PMI and CQI reflect the transmission overall the M subbands. This could limit the scheduling flexibility and cause CQI mismatch when Dynamic point selection/blanking (DPS/DB) and joint transmission (JT) schemes are used. One approach is to have UE perform joint selection of M selected subbands for two or more CoMP hypotheses (also referred to as CSI process). This can be further configurable by the network.

An example configuration with the common subband report is shown below:

TABLE XXVI

| | |
|---|---|
| Mode 2-2 (alternate) | Common M-Subband Index for both CSI processes 1 and 2, M-Subband CQI/PMI for CSI process 1 M-Subband CQI/PMI for CSI process 2 Wideband CQI/PMI/RI for CSI process 1 Wideband CQI/PMI/RI for CSI process 2 |

The use of Mode 2-2 or alternate Mode 2-2 can be indicated by a higher layer parameter or dynamically signaled parameter with DCI.

In one embodiment, whether a common or different subband selection must be performed may be indicated by the network. Such indication could be using dynamic signaling in DCI format or could be using higher layer signaling. In one method, such signaling could indicate a linkage between one or more of the CSI processes configured in the aperiodic report. In such case, the common sub-band is reported for the linked CSI processes.

Further definition of UE behavior must be defined on how the common subband index must be selected. In release 10, a subband index is selected to maximize the CQI when a single CSI process is configured. In one embodiment, the UE should select the common subband index based on one or more CQIs of the two or more CSI processes that are configured for common subband reporting. In one method, the common subband index is based on the sum total CQI of two or more CSI processes. In one method, the common subband index is based on the CSI process with the maximum CQI (e.g, maximum wideband CQI).

In one method, the common subband index is based on a reference CSI process. The reference CSI process could be determined based one or more parameters associated with the two or more CSI processes. Such parameters could be the timing parameters or CSI-RS resource or IMR or inter-ference resources, etc. In one method, the common subband index is based on the CSI process with the lowest index. In one method, the common subband index is based on CSI process with the lower (or higher) periodicity. In one method, the reference CSI process is configured by the network with higher layer signaling or dynamic signaling. As an example, a network configures CSI process 1 as the reference process. In this case, the subband selection must be based on CSI process 1 and the subband selection on other subbands and the rest of feedback parameters (e.g., PMI/CQI) of each CSI process must be aligned with this selection.

In one embodiment, M subband CQI is only reported for a subset of CSI process. In one example, M-subband CQI is only reported for CSI process 1. In this case, network may indicate this behavior, i.e., to drop the M-subband reports for one or more CSI processes.

In one embodiment, a larger value of M may be supported for the case of reporting with multiple CSI processes to improve performance.

CSI Processes

The simplest approach for supporting feedback corresponding to multiple CSI processes is to have independent configuration of feedback for these processes. However, there is some benefit in introducing some dependencies among CSI processes considering CoMP behavior, to reduce overhead and to improve scheduling. For example, there is benefit in aligning the reports across multiple CSI processes. Some parameters that can be common to two or more processes are summarized below.

Common RI

If the scheduler intends to support joint transmission from two different transmission points (i.e., different non-zero power CSI-RS), then it requires CQI with the same common rank hypothesis from both reports.

Common Subband

If the scheduler intends to support frequency selective joint transmission from two different transmission points, then the set of subbands selected by the UE must be the same to avoid CQI mismatch and scheduler restrictions Common PMI If the scheduler intends to support selection between dynamic point selection and dynamic point blanking, it may request CSI for two CSI processes that share same non-zero power CSI-RS but different IMR resource. In this case, a common PMI may be used, since the channel corresponding to both the CSI processes is the same.

Embodiment 1

Common PTI

In this embodiment, a precoder type indication (PTI) is sent along with RI in a single report for 8Tx feedback. The PTI is only applicable for PUCCH mode 2-1 summarized below. Essentially, the PTI is used to switch between two modes, one in which the wideband first precoder component W1 is feedback and another in which the subband second precoder components are feedback, as illustrated in FIGURE B:

PUCCH Mode 2-1 for 8Tx (Extension of Rel.8 PUCCH Mode 2-1)
    Overall precoder W is determined from 3-subframe report conditioned upon the latest RI report Reporting format
  Report 1: RI and 1-bit precoder type indication (PTI)
  Report 2:
    PTI=0: W1 will be reported
    PTI=1: wideband CQI and wideband W2 will be reported
  Report 3:
    PTI=0: wideband CQI and wideband W2 will be reported
    PTI=1: subband CQI, subband W2,
      Transmission of subband selection indicator versus predefined cycling is FFS
    For 2 and 4 Tx, PTI is assumed to be set to 1 and is not signaled When PTI=0, the UE sends wideband CQI feedback and wideband first PMI (W1) feedback and wideband second PMI (W2) feedback as shown in FIG. 8A. When PTI=1, the UE reports wideband CQI, wideband W2, subband CQI and subband W2 as shown in FIG. 8B. For 8Tx codebook, the overall precoder is given by W=W1W2 (see 36.211).

In one method, a network indicates a reference CSI process corresponding to a reference parameter for a given CSI process. For example, if CSI process 1 is indicated as reference process for CSI process 2, with the reference property being PTI, then CSI corresponding to CSI process 1 must be based on the PTI of CSI process 1 (i.e., the reference process).

Embodiment 2

In one embodiment, the reference CSI processes for different parameters described above are independently configured as captured below.
CSI-Process-r11:

| CSI-Process-ID | Integer |
| --- | --- |
| CSI-RS-config | |
| IMR-config | |
| (Optional) Rank_Reference_Process | a CSI-Process-ID |
| (Optional) UE-Selected-Subband_Reference_Process | a CSI-Process-ID |
| (Optional) PMI_Reference_Process | a CSI-Process-ID |
| (Optional) PTI_Reference_Process | a CSI-Process-ID |

Embodiment 3

In one method, a single parameter is used to indicate to the UE the reference CSI process that must be used as for two or more feedback parameters (RI/PMI/Subband/PTI). One example is shown below.
CSI-Process-r11:

| CSI-Process-ID | Integer |
| --- | --- |
| CSI-RS-config | |
| IMR-config | |
| (Optional) Rank_Reference_Process | a CSI-Process-ID |
| (Optional) UE-Selected-Subband_Reference_Process | a CSI-Process-ID |
| (Optional) PMI/PTI_Reference_Process | a CSI-Process-ID |

The UE uses the CSI process indicated by PMI/PTI_Reference_Process to also derive reference process for PTI.

In general, the reference process for a feedback parameter could be indicated implicitly by the reference process for other feedback parameters as in the example below.

CSI-Process-r11:

| CSI-Process-ID | Integer |
| --- | --- |
| CSI-RS-config | |
| IMR-config | |
| (Optional) Rank_Reference_Process | a CSI-Process-ID |
| (Optional) UE-Selected-Subband_Reference_Process | a CSI-Process-ID |
| (Optional) PMI_Reference_Process | a CSI-Process-ID |

The UE uses the CSI process indicated by PMI_Reference_Process to also derive reference process for PTI.

In another example, the CSI process indicated by rank_reference_process is also used to derive the UE-selected-subband reference process, and no UE-Selected-Subband_Reference_Process is explicitly configured.

The timing parameters (e.g, periodicity, offsets of the feedback reports) of the individual CSI processes may not be aligned for periodic feedback. In this case, whenever a common metric is reported, the timing reference for the subsequent CSI process must be clearly defined with respect to the reference process.

Embodiment 4

In one method, the reference PTI of the most recently reported periodic reference process must be used. Similarly for common RI/subband/PMI, the reference RI/subband/PMI of the most recently reported periodic reference process must be used.

In addition to the feedback components corresponding to multiple CSI processes, additional feedback configuration parameters are needed for CSI process definition. Some feedback configuration parameters are discussed below.
Codebook Subset Restriction The codebook subset restriction is defined as follows in the current LTE specification:

A UE is restricted to reporting PMI, RI and PTI within a precoder codebook subset specified by a bitmap parameter codebookSubsetRestriction configured by higher layer signaling. For a specific precoder codebook and associated transmission mode, the bitmap can specify all possible precoder codebook subsets from which the UE can assume the eNB may be using when the UE is configured in the relevant transmission mode. Codebook subset restriction is supported for transmission modes 3, 4, 5, 6 and for transmission modes 8 and 9 with PMI/RI reporting. The resulting number of bits for each transmission mode is given in Table 7.2-1b of 36.213. The bitmap forms the bit sequence $a_{A_c-1}, \ldots, a_3, a_2, a_1, a_0$ where $a_0$ is the LSB and $a_{A_c-1}$ is the MSB and where a bit value of zero indicates that the PMI and RI reporting is not allowed to correspond to precoder(s) associated with the bit. The association of bits to precoders for the relevant transmission modes are given as follows:
1. Transmission mode 3
  a. 2 antenna ports: bit $a_{v-1}$, v=2 is associated with the precoder in Table 6.3.4.2.3-1 of [REF3] corresponding to v layers and codebook index 0 while bit $a_0$ is associated with the precoder for 2 antenna ports in Section 6.3.4.3 of [REF3].
  b. 4 antenna ports: bit $a_{v-1}$, v=2, 3, 4 is associated with the precoders in Table 6.3.4.2.3-2 of [REF3] corresponding to v layers and codebook indices 12, 13, 14, and 15 while bit $a_0$ is associated with the precoder for 4 antenna ports in Section 6.3.4.3 of [REF3].

2. Transmission mode 4
    a. 2 antenna ports: see Table 7.2-1c
    b. 4 antenna ports: bit $a_{16(v-1)+i_c}$ is associated with the precoder for v layers and with codebook index $i_c$ in Table 6.3.4.2.3-2 of [REF3].
3. Transmission modes 5 and 6
    a. 2 antenna ports: bit $a_{i_c}$ is associated with the precoder for v=1 layer with codebook index $i_c$ in Table 6.3.4.2.3-1 of [REF3].
    b. 4 antenna ports: bit $a_{i_c}$ is associated with the precoder for v=1 layer with codebook index $i_c$ in Table 6.3.4.2.3-2 of [REF3].
4. Transmission mode 8
    a. 2 antenna ports: see Table 7.2-1c
    b. 4 antenna ports: bit $a_{16(v-1)+i_c}$ is associated with the precoder for v layers and with codebook index $i_c$ in Table 6.3.4.2.3-2 of [REF3], v=1, 2.
5. Transmission mode 9
    a. 2 antenna ports: see Table 7.2-1c
    b. 4 antenna ports: bit $a_{16(v-1)+i_c}$ is associated with the precoder for v layers and with codebook index in Table 6.3.4.2.3-2 of [REF3].
    c. 8 antenna ports: bit $a_{f1(v-1)+i_{c1}}$ is associated with the precoder for v layers (v∈{1, 2, 3, 4, 5, 6, 7, 8}) and codebook index $i_{c1}$ where f1(•)={0, 16, 32, 36, 40, 44, 48, 52} and bit $a_{53+g1(v-1)+i_{c2}}$ is associated with the precoder for v layers (v∈{1, 2, 3, 4}) and codebook index $i_{c2}$ where g1(•)={0, 16, 32, 48}. Codebook indices $i_{c1}$ and $i_{c2}$ are given in Table 7.2.4-1, 7.2.4-2, 7.2.4-3, 7.2.4-4, 7.2.4-5, 7.2.4-6, 7.2.4-7, or 7.2.4-8, for v=1, 2, 3, 4, 5, 6, 7, or 8 respectively.

TABLE XXVII corresponding to Table 7.2-1b: Number of bits in codebook subset restriction bitmap for applicable transmission modes.

| | Number of bits $A_c$ | | |
| --- | --- | --- | --- |
| | 2 antenna ports | 4 antenna ports | 8 antenna ports |
| Transmission mode 3 | 2 | 4 | |
| Transmission mode 4 | 6 | 64 | |
| Transmission mode 5 | 4 | 16 | |
| Transmission mode 6 | 4 | 16 | |
| Transmission mode 8 | 6 | 32 | |
| Transmission mode 9 | 6 | 64 | 109 |

TABLE XXVIII corresponding to Table 7.2-1c: Association of bits in codebookSubSetRestriction bitmap to precoders in the 2 antenna port codebook of Table 6.3.4.2.3-1 in [REF3].

| Codebook | Number of layers v | |
| --- | --- | --- |
| index $i_c$ | 1 | 2 |
| 0 | $a_0$ | — |
| 1 | $a_1$ | $a_4$ |
| 2 | $a_2$ | $a_5$ |
| 3 | $a_3$ | — |

In one method, codebook subset restriction is defined per CSI process.

In one method a common codebooksubsetrestriction parameter could be used for multiple CSI processes. If two CSI process share the same non zero power CSI-RS, network may prefer to use the same parameter for both cases.

PMI/RI Disabling

In one method, a higher layer parameter, which could be referred to as "PMI/RI disabling" indicates whether to disable PMI/RI for a CSI process. In other words, for a first value of such parameter, only CQI is reported, and for a second of PMT/RI/CQI are reported.

In one method, a common PMI RI disabling can be supported for two or more CSI processes.

Subframe Subsets

A UE is configured with resource-restricted CSI measurements if the subframe sets $C_{CSI,0}$ and $C_{CSI,1}$ are configured by higher layers. In one method, common subframe subsets $C_{CSI,0}$ and $C_{CSI,1}$ are configured for two or more CSI processes.

Embodiment 5

In one embodiment, a CSI process can be configured as follows including the additional configuration parameters. CSI-Process-r11:

| | |
| --- | --- |
| CSI-Process-ID | Integer |
| CSI-RS-config | |
| IMR-config | |
| Codebooksubsetrestriction-config | |
| PMI/RI Disabling-config | |
| SubframeSubsets_config | |
| (Optional) Rank_Reference_Process | a CSI-Process-ID |
| (Optional) UE-Selected-Subband_Reference_Process | a CSI-Process-ID |
| (Optional) PMI_Reference_Process | a CSI-Process-ID |
| (Optional) PTI_Reference_Process | a CSI-Process-ID |

The parameters that are independently configured per CSI process, including CSI-RS, IMR, codebooksubsetrestriction, PMI/RI disabling, subframe subsets in the above example, are referred to as the "independently configured parameters" of a CSI process. The feedback parameters that follow a reference process including RI, UE selected subband, PMI, PTI are referred to as the "reference feedback parameters."

Embodiment 6

Error Cases Due to Conflict of Independently Configured and Reference Parameters Some error cases might result for some values of independently configured parameters and the reference parameters. Examples are presented below:

Example 1

PMI/RI disabling is not configured for CSI process 1, but is configured for CSI process 2. However, CSI process 1 is configured as rank reference process for CSI process 2. In this case, CSI process 2 is required to follow rank of CSI process 1, but limited to rank 1 due to the disabling of PMI/RI.

In such case, the UE behavior must be specified to avoid confusion. In one method, UE must interpret the independently configured parameter as overriding the reference process parameter. In this example, UE would just use rank 1 for CSI process 1 consistent with PMI/RI disabling configuration for CSI process 1 regardless of rank of CSI process 2.

Example 2

Codebook subset restriction parameter is different for CSI process 1 and CSI process 2. However, CSI process 1 is configured as PMI reference process for CSI process 2. If the selected PMI for CSI process 1 is not present in the codebook subset configured for CSI process 2, then a conflict occurs. In one method, UE must interpret the independently configured parameter as overriding the reference process parameter. In this example, UE would use the PMI available in the codebook subset of CSI process 2 and not use PMI of codebook subset 1. In another method, UE must interpret the reference process parameter as overriding the independently configured parameter. In this example, UE would use the PMI of the CSI process 1, regardless of whether it is present in the codebook subset of CSI process 2.

In one embodiment, which is a generalization of the above observations, the rule to derive a feedback parameter (RI, CQI, PMI, PTI . . . ) for a CSI process can be based on the values of one or more independently configured parameters (CSI-RS, IMR, codebooksubsetrestriction, PMI/RI disabling, subframe subsets) of one or more CSI processes and one or more reference process parameters (Rank_Reference_Process, UE-Selected-Subband_Reference_Process, PMI_Reference_Process, PTI_Reference_Process) of one or more CSI processes. As described in the examples above, such rules may be needed to ensure consistent feedback operation and avoid conflicts/error cases.

While each process flows and/or signal sequences depicted in the figures and described above relate to a particular sequence of steps and/or signals, either in series or in tandem, unless explicitly stated or otherwise self-evident (e.g., a signal cannot be received before being transmitted), no inference should be drawn from that sequence regarding specific order of performance, performance of steps or portions or transmission of signals thereof serially rather than concurrently or in an overlapping manner, or performance the steps or transmission of signals depicted exclusively without the occurrence of intervening or intermediate steps or signals. Moreover, those skilled in the art will recognize that complete processes and signal sequences are not illustrated or described. Instead, for simplicity and clarity, only so much of the respective processes and signal sequences as is unique to the present disclosure or necessary for an understanding of the present disclosure is depicted and described.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A user equipment, comprising:
a transceiver configured to receive a signal containing information regarding configuration of at least two channel state information (CSI) processes,
wherein a first of the at least two CSI processes corresponds to a first CSI reporting configuration associated with a first set of CSI report parameters determined based on a first CSI-reference signal (CSI-RS) resource and a first CSI-interference measurement,
wherein the first of the at least two CSI processes is used for generating a first CSI report,
wherein a second of the at least two CSI processes is identified by a CSI process identifier and is a rank indicator (RI)-reference CSI process, where an RI determined by the second CSI process is also used for aligned CSI processes, and
wherein the first CSI process is aligned with the RI-reference CSI process by a CSI process configuration parameter in the configuration for the first CSI process, the CSI process configuration parameter indicating the CSI process identifier of the second CSI process; and
a controller configured to determine the configurations of the at least two CSI processes from the received signal and use the first CSI reporting configuration to generate the first CSI report including the RI determined by the second CSI process.

2. The user equipment according to claim 1, wherein the first CSI report comprises information determined based on at least one CSI reference signal (CSI-RS), and wherein the CSI process configuration parameter is a Rank_Reference_Process parameter.

3. The user equipment according to claim 1, wherein the RI defined for the RI-reference CSI process is applied for CSI reporting by the user equipment to all of two or more transmission points.

4. The user equipment according to claim 1, wherein the first CSI report comprises a periodic CSI report.

5. The user equipment according to claim 1, wherein the first CSI report comprises an aperiodic CSI report.

6. A user equipment, comprising:
a control system configured to report channel state information (CSI) to each of two or more transmission points from which the user equipment is receiving signals using at least two channel state information (CSI) processes,
wherein a first of the at least two CSI processes corresponds to a first CSI reporting configuration associated with a first set of CSI report parameters determined based on a first CSI-reference signal (CSI-RS) resource and a first CSI-interference measurement,
wherein the first of the at least two CSI processes is used for generating a CSI report,
wherein a second of the at least two CSI processes is identified by a CSI process identifier and is a rank indicator (RI)-reference CSI process, where an RI determined by the second CSI process is also used for aligned CSI processes,
wherein the first CSI process is aligned with the RI-reference CSI process by a CSI process configuration parameter in the configuration for the first CSI process, the CSI process configuration parameter indicating the CSI process identifier of the second CSI process,
wherein, in response to a collision between at least two CSI reports to different ones of the two or more transmission points each with reporting type of a same priority and employing different CSI processes, the control system is configured to drop one of the at least two CSI reports based upon configuration indices associated with the CSI processes for the two CSI reports, and
wherein, in response to a collision between at least two CSI reports to different ones of the two or more transmission points each with reporting type of a same priority and employing a same CSI measurement process, the control system is configured to drop one of the at least two CSI reports based upon indices associated the two or more transmission points.

7. The user equipment according to claim 6, wherein one or more of the at least two CSI reports other than the one of the at least two CSI reports corresponding to a lowest RI-reference CSI process is dropped.

8. The user equipment according to claim 6, wherein the one of the at least two CSI reports corresponding to a lowest CSI configuration index is dropped.

9. The user equipment according to claim 6, wherein all of the at least two CSI reports are dropped except for one of the at least two CSI reports corresponding to a lowest CSI configuration index.

10. The user equipment according to claim 6, wherein the first CSI report comprises a periodic CSI report.

11. A base station, comprising:
a transceiver configured to transmit a signal containing information regarding configuration of at least two channel state information (CSI) processes,
wherein a first of the at least two CSI processes corresponds a first CSI reporting configuration associated with a first set of CSI report parameters determined based on a first CSI-reference signal (CSI-RS) resource and a first CSI-interference measurement,
wherein the first of the at least two CSI processes is used for generating a first CSI report,
wherein a second of the at least two CSI processes is identified by a CSI process identifier and is a rank indicator (RI)-reference CSI process, where an RI determined by the second CSI process is also used for aligned CSI processes, and
wherein the first CSI process is aligned with the RI-reference CSI process by a CSI process configuration parameter in the configuration for the first CSI process, the CSI process configuration parameter indicating the CSI process identifier of the second CSI process; and
a controller configured to determine, from a received CSI report, CSI for a first of the at least two CSI processes.

12. The base station according to claim 11, wherein the first CSI report comprises information determined based on at least one CSI reference signal (CSI-RS), and wherein the CSI process configuration parameter is a Rank_Reference_Process parameter.

13. The base station according to claim 11, wherein the RI identified for the RI-reference CSI process is applied for CSI reporting by a user equipment to all of two or more transmission points.

14. The base station according to claim 11, wherein the first CSI report comprises a periodic CSI report.

15. The base station according to claim 11, wherein the first CSI report comprises an aperiodic CSI report.

16. A base station, comprising:
a control system configured to receive channel state information (CSI) reports from a user equipment reporting CSI to each of two or more transmission points from which the user equipment is receiving signals using at least two CSI processes,
wherein a first of the at least two CSI process corresponds to a first CSI reporting configuration associated with a first set of CSI report parameters determined based on a first CSI-reference signal (CSI-RS) resource and a first CSI-interference measurement,
wherein the first of the at least two CSI processes is used for generating a CSI report,
wherein a second of the at least two CSI processes is identified by a CSI process identifier and is a rank-indicator (RI)-reference CSI process, where an RI determined by the second CSI process is also used for aligned CSI processes,
wherein the first CSI process is aligned with the RI-reference CSI process by a CSI process configuration parameter in the configuration for the first CSI process, the CSI process configuration parameter indicating the CSI process identifier of the second CSI process,
wherein in response to a collision between at least two CSI reports from the user equipment to different ones of the two or more transmission points each with reporting type of a same priority and employing different CSI processes, a received one of the at least two CSI reports is based upon configuration indices associated with the CSI processes for the two CSI reports and,
wherein in response to a collision between at least two CSI reports from the user equipment to different ones of the two or more transmission points each with reporting type of a same priority and employing a same CSI process, a received one of the at least two CSI reports is based upon indices associated with the two or more transmission points.

17. The base station according to claim 16, wherein the received one of the at least two CSI reports corresponds to a lowest RI-reference CSI process index.

18. The base station according to claim 16, wherein the received one of the at least two CSI reports corresponds to a lowest of two CSI configuration indices associated with two CSI reports of the at least two CSI reports.

19. The base station according to claim 16, wherein the received one of the at least two CSI reports corresponds to a lowest of all CSI configuration indices associated with the at least two CSI reports.

20. The base station according to claim 16, wherein the first CSI report comprises a periodic CSI report.

21. A method, comprising:
receiving, in a user equipment, a signal containing information regarding configuration of at least two channel state information (CSI) processes,
wherein a first of the at least two CSI processes corresponds to a first CSI reporting configuration associated with a first set of CSI report parameters determined based on a first CSI-reference signal (CSI-RS) resource and a first CSI-interference measurement,
wherein the first of the at least two CSI processes is used for generating a first CSI report, and
wherein a second of the at least two CSI processes is identified by a CSI process identifier and is a rank indicator (RI)-reference CSI process, where an RI determined by the second CSI process is also used for aligned CSI processes, and
wherein the first CSI process is aligned with the RI-reference CSI process by a CSI process configuration parameter in the configuration for the first CSI process, the CSI process configuration parameter indicating the CSI process identifier of the second CSI process;
determining, in the user equipment, the configurations of the at least two CSI processes from the received signal; and
using the first CSI reporting configuration to generate the first CSI report including the RI determined by the second CSI process.

22. The method according to claim 21, wherein the first CSI report comprises information determined based on at least one CSI reference signal (CSI-RS), and wherein the CSI process configuration parameter is a Rank_Reference_Process parameter.

23. The method according to claim 21, wherein the RI identified for the RI-reference CSI process is applied for CSI reporting by the user equipment to all of two or more transmission points.

24. The method according to claim 21, wherein the first CSI report comprises a periodic CSI report.

25. The method according to claim 21, wherein the first CSI report comprises an aperiodic CSI report.

26. A method, comprising:
reporting, from a user equipment, channel state information (CSI) to each of two or more transmission points from which the user equipment is receiving signals using at least two CSI processes,
wherein a first of the at least two CSI processes corresponds to a first CSI reporting configuration associated with a first set of CSI report parameters determined based on a first CSI-reference signal (CSI-RS) resource and a first CSI-interference measurement,
wherein the first of the at least two CSI processes is used for generating a first CSI report,
wherein a second of the at least two CSI processes is identified by a CSI process identifier and is a rank indicator (RI)-reference CSI process, where an RI determined by the second CSI process is also used for aligned CSI processes,
wherein the first CSI process is aligned with the RI-reference CSI process by a CSI process configuration parameter in the configuration for the first CSI process, the CSI process configuration parameter indicating the CSI process identifier of the second CSI process;
in response to a collision between at least two CSI reports from the user equipment to different ones of the two or more transmission points each with reporting type of a same priority and employing different CSI processes, dropping, at the user equipment, one of the at least two CSI reports based upon configuration indices associated with the two CSI reports; and
in response to a collision between at least two CSI reports to different ones of the two or more transmission points each with reporting type of a same priority and employing a same CSI process, dropping, at the user equipment, one of the at least two CSI reports based upon indices associated the two or more transmission points.

27. The method according to claim 26, wherein one or more of the at least two CSI reports other than the one of the at least two CSI reports corresponding to a lowest RI-reference CSI process is dropped.

28. The method according to claim 26, wherein the one of the at least two CSI reports corresponding to a lowest CSI configuration index is dropped.

29. The method according to claim 26, wherein all of the at least two CSI reports are dropped except for one of the at least two CSI reports corresponding to a lowest CSI configuration index.

30. The method according to claim 26, wherein the first CSI report comprises a periodic CSI report.

* * * * *

UNITED STATES PATENT AND TRADEMARK OFFICE
CERTIFICATE OF CORRECTION

| | |
|---|---|
| PATENT NO. | : 11,121,834 B2 |
| APPLICATION NO. | : 13/920872 |
| DATED | : September 14, 2021 |
| INVENTOR(S) | : Krishna Sayana et al. |

It is certified that error appears in the above-identified patent and that said Letters Patent is hereby corrected as shown below:

On the Title Page

After Item (65) Prior Publication Data, insert:
-- Related U.S. Application Data
(60) Provisional application No. 61/661,214, filed on Jun. 18, 2012, provisional application No. 61/679,571, filed on Aug. 3, 2012, provisional application No. 61/692,581, filed on Aug. 23, 2012. --

Signed and Sealed this
Twenty-sixth Day of April, 2022

Katherine Kelly Vidal
*Director of the United States Patent and Trademark Office*